United States Patent
Ye et al.

(10) Patent No.: US 10,925,082 B2
(45) Date of Patent: Feb. 16, 2021

(54) SUB-PRB RESOURCE ALLOCATION FOR PUSCH IN EVEN FURTHER ENHANCED MTC

(71) Applicant: Apple Inc., Cupertino, CA (US)

(72) Inventors: Qiaoyang Ye, San Jose, CA (US); Debdeep Chatterjee, San Jose, CA (US); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 16/488,200

(22) PCT Filed: Mar. 21, 2018

(86) PCT No.: PCT/US2018/023467
§ 371 (c)(1),
(2) Date: Aug. 22, 2019

(87) PCT Pub. No.: WO2018/175521
PCT Pub. Date: Sep. 27, 2018

(65) Prior Publication Data
US 2020/0068608 A1 Feb. 27, 2020

Related U.S. Application Data

(60) Provisional application No. 62/586,745, filed on Nov. 15, 2017, provisional application No. 62/562,803, (Continued)

(51) Int. Cl.
*H04W 72/12* (2009.01)
*H04L 5/00* (2006.01)
*H04L 5/14* (2006.01)

(52) U.S. Cl.
CPC ......... *H04W 72/1289* (2013.01); *H04L 5/001* (2013.01); *H04L 5/0042* (2013.01); *H04L 5/0094* (2013.01); *H04L 5/1469* (2013.01)

(58) Field of Classification Search
CPC ......... H04L 5/00; H04L 5/0007; H04L 5/001; H04L 5/0042; H04L 5/0044;
(Continued)

(56) References Cited

U.S. PATENT DOCUMENTS 10,050,818 B2 * 8/2018 Hwang ................. H04L 5/0048
10,469,222 B2 * 11/2019 You ..................... H04L 5/0051
(Continued)

FOREIGN PATENT DOCUMENTS

CN 104811220 A 7/2015
EP 3032862 A1 6/2016
(Continued)

OTHER PUBLICATIONS

"International Application Serial No. PCT/US2018/023467, International Search Report dated Jul. 4, 2018", 3 pgs.
(Continued)

*Primary Examiner* — Tri H Phan
(74) *Attorney, Agent, or Firm* — Kowert, Hood, Munyon, Rankin & Goetzel, P.C.

(57) ABSTRACT

Systems and methods of enabling sub-PRB allocation for an efeMTC UE are described. The efeMTC UE transmits to an eNB or gNB support for a sub-PRB PUSCH transmission in a capability information element of a RRC message. The RRC message is transmitted after transmission of message 3 of the RACH procedure. The efeMTC UE receives semi-statistical dedicated RRC signaling that contains a sub-PRB configuration that is dependent on a sub-PRB maximum PUSCH channel bandwidth, a CE mode, a RL configured for the PUSCH and a TDD configuration and a sub-PRB PUSCH transmission allocation. The efeMTC UE transmits a sub-PRB PUSCH transmission on the sub-PRB PUSCH transmission allocation.

20 Claims, 7 Drawing Sheets

Related U.S. Application Data filed on Sep. 25, 2017, provisional application No. 62/543,719, filed on Aug. 10, 2017, provisional application No. 62/502,368, filed on May 5, 2017, provisional application No. 62/476,393, filed on Mar. 24, 2017.

(58) Field of Classification Search
CPC ....... H04L 5/0091; H04L 5/0094; H04L 5/14; H04L 5/1469; H04W 72/04; H04W 72/048; H04W 72/12; H04W 72/1289
See application file for complete search history.

(56) References Cited

U.S. PATENT DOCUMENTS

| | | |
|---|---|---|
| 10,531,442 B2 * | 1/2020 | Park .................. H04W 72/1289 |
| 10,778,384 B2 * | 9/2020 | Song ....................... H04L 5/003 |
| 2010/0195607 A1 | 8/2010 | Lee et al. |
| 2020/0100316 A1 * | 3/2020 | Liu .................. H04W 74/0833 |

FOREIGN PATENT DOCUMENTS

| | | |
|---|---|---|
| KR | 101447153 B1 | 10/2014 |
| WO | WO-2016099057 A1 | 6/2016 |
| WO | WO-2016114544 A1 | 7/2016 |
| WO | WO-2018175521 A1 | 9/2018 |

OTHER PUBLICATIONS

"International Application Serial No. PCT/US2018/023467, Written Opinion dated Jul. 4, 2018", 7 pgs.

* cited by examiner

SUB-PRB RESOURCE ALLOCATION FOR PUSCH IN EVEN FURTHER ENHANCED MTC

PRIORITY CLAIM

This application is a U.S. National Stage Filing under 35 U.S.C. 371 from International Application No. PCT/US2018/023467, filed Mar. 15, 2018 and published in English as WO 2018/175521 on Sep. 27, 2018, which claims the benefit of priority to U.S. Provisional Patent Application Ser. No. 62/476,393, filed Mar. 24, 2017, entitled "DESIGN OF SUB-PRB RESOURCE ALLOCATION FOR PUSCH IN REL-15 EVEN FURTHER ENHANCED MTC," U.S. Provisional Patent Application Ser. No. 62/502,368, filed May 5, 2017, entitled "SUB-PHYSICAL RESOURCE BLOCK RESOURCE ALLOCATION FOR PHYSICAL UPLINK SHARED CHANNEL IN EVEN FURTHER ENHANCED MACHINE TYPE COMMUNICATION," U.S. Provisional Patent Application Ser. No. 62/543,719, filed Aug. 10, 2017, entitled "SUB-PHYSICAL RESOURCE BLOCK (PRB) RESOURCE ALLOCATION FOR PUSCH IN RELEASE 15 (REL-15) EVEN FURTHER ENHANCED MACHINE TYPE COMMUNICATION (EFEMTC)," U.S. Provisional Patent Application Ser. No. 62/562,803, filed Sep. 25, 2017, entitled "SUB-PHYSICAL RESOURCE BLOCK (PRB) RESOURCE ALLOCATION FOR PUSCH IN RELEASE 15 (REL-15) EVEN FURTHER ENHANCED MACHINE TYPE COMMUNICATION (EFEMTC)," U.S. Provisional Patent Application Ser. No. 62/586,745, filed Nov. 15, 2017, entitled "SUB-PHYSICAL RESOURCE BLOCK (PRB) RESOURCE ALLOCATION FOR PUSCH IN RELEASE 15 (REL-15) EVEN FURTHER ENHANCED MACHINE TYPE COMMUNICATION (EFEMTC)," each of which is incorporated herein by reference in its entirety.

TECHNICAL FIELD

Embodiments pertain to radio access networks (RANs). Some embodiments relate to Machine Type Communication (MTC) UEs in cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to resource allocation for user equipment (UEs).

BACKGROUND

The use of 3GPP LTE systems (including LTE and LTE-A systems) has increased due to both an increase in the types of devices user equipment (UEs) using network resources as well as the amount of data and bandwidth being used by various applications, such as video streaming, operating on these UEs. In particular, both typical UEs such as cell phones and Internet of Things (IoT) UEs currently use 3GPP LTE systems. The latter such UEs, which may include machine-type communications (MTC) UEs pose particular challenges as such UEs are typically low cost devices that have low power consumption, and thus have smaller batteries and smaller communication ranges. Examples of such UEs include sensors (e.g., sensing environmental conditions) or microcontrollers in appliances or vending machines. The number of MTC UEs in use is expected to be massive, thus leading to further development as networks attempt to accommodate for the disparate requirements of the different types of UEs. Work is ongoing to introduce enhancements to achieve even lower power consumption and to make efficient use of network resources.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
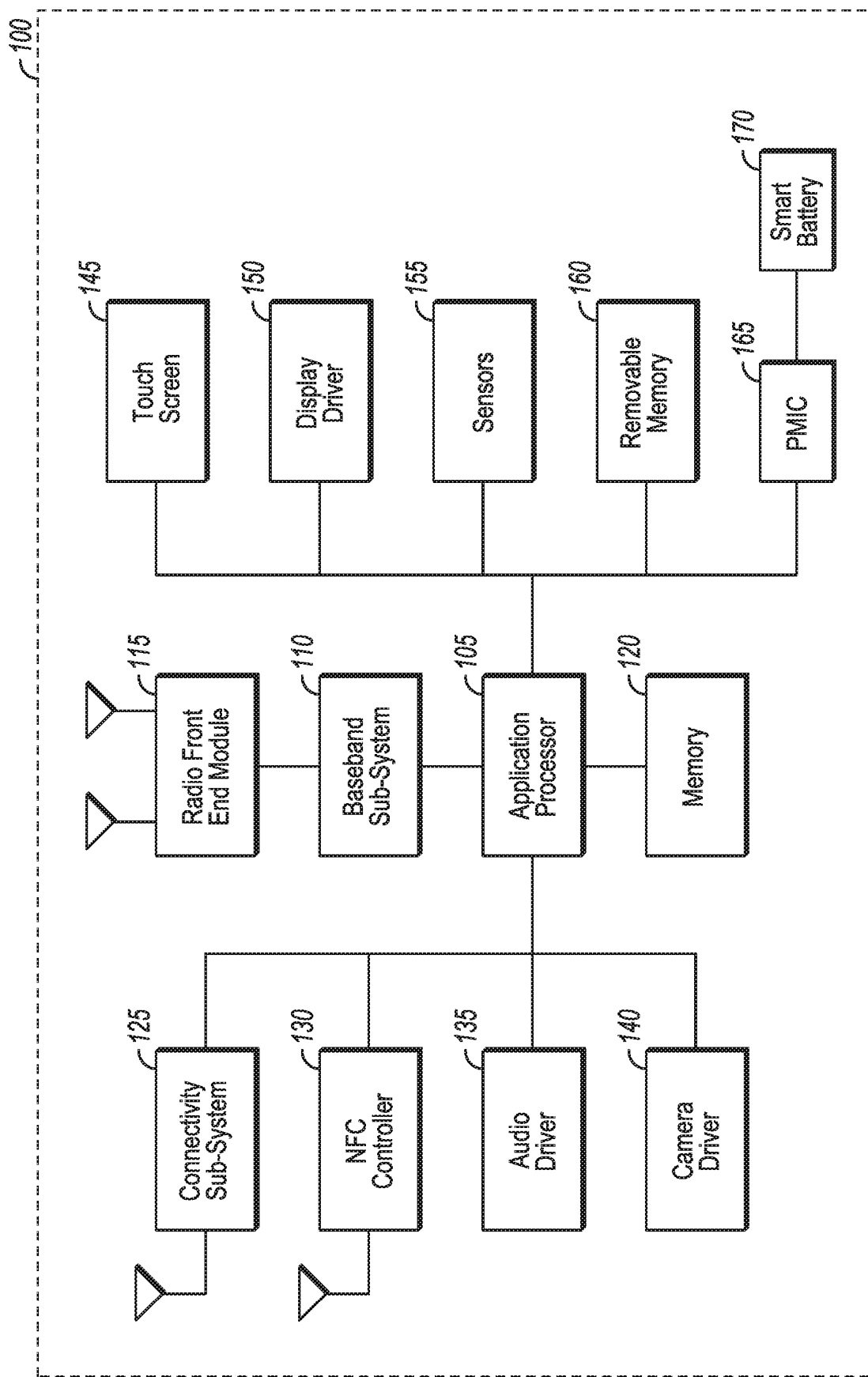
FIG. 1 illustrates a UE in accordance with some embodiments.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
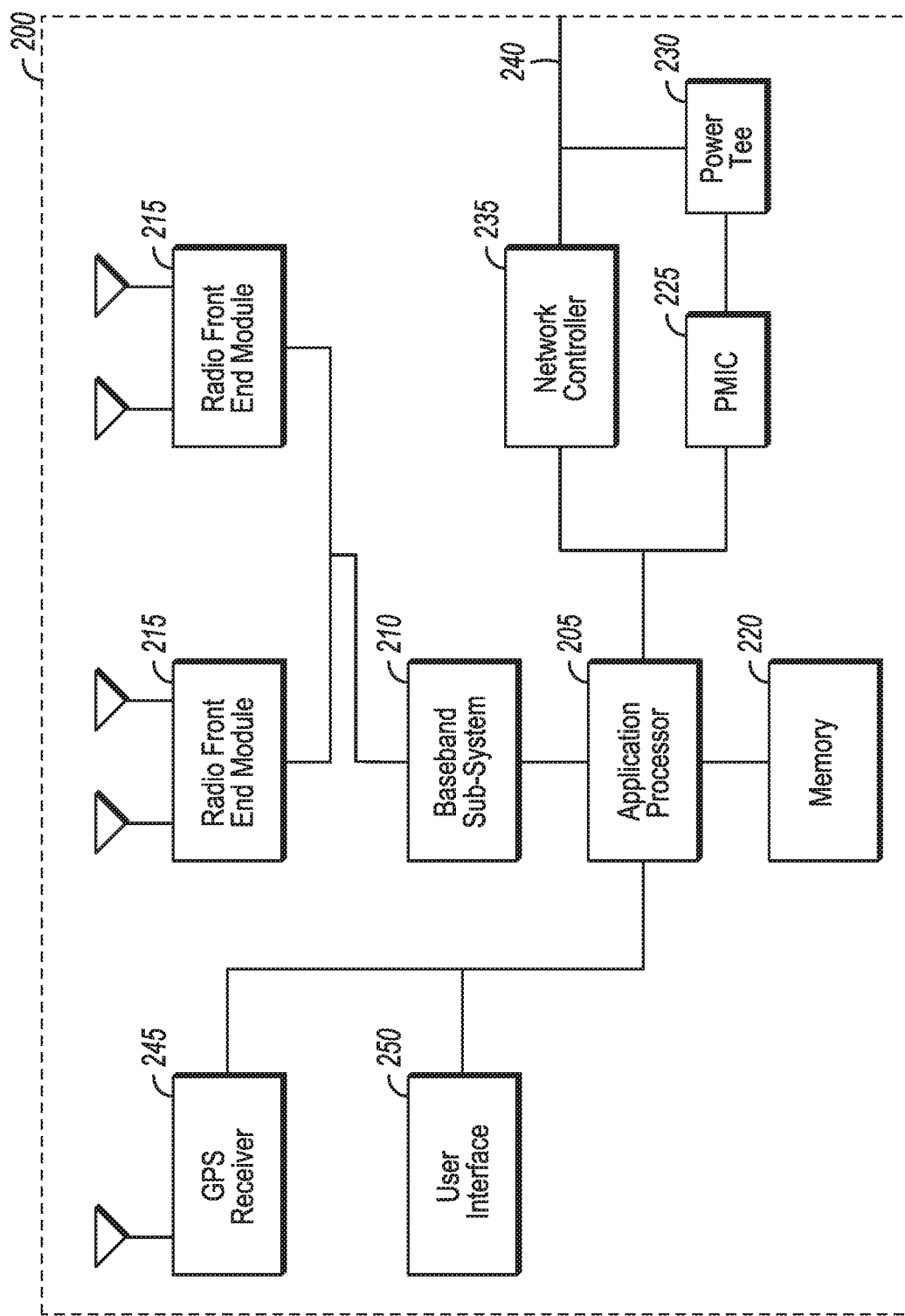
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, I²C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
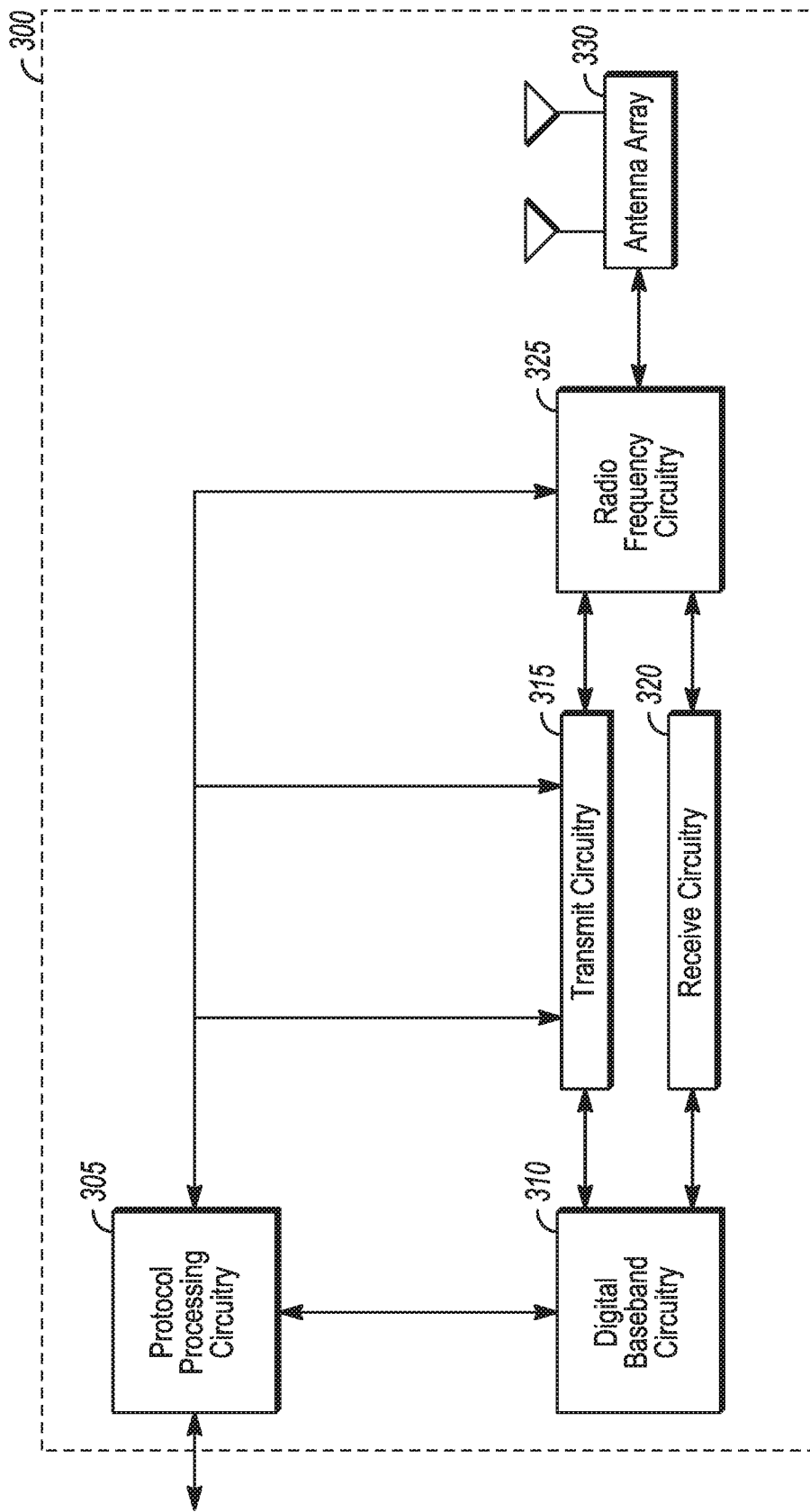
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry. In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry. IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system In an example aspect, the baseband processing subsystem may include one or more of each of an accelerator subsystem, buffer memory, interconnect subsystem, audio sub-system, shared memory sub-system, digital I/O sub-system, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system.

The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I$^2$C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
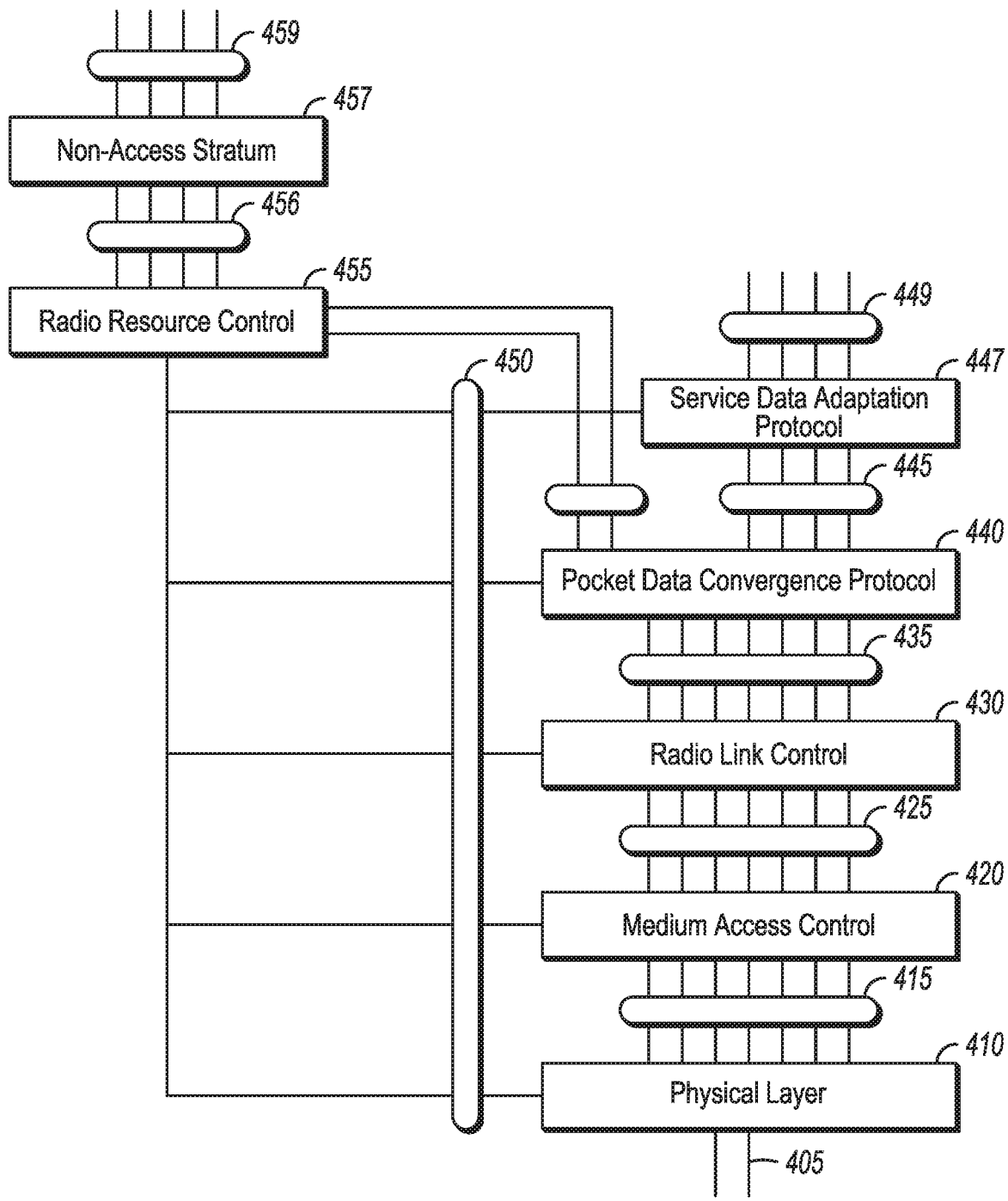
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
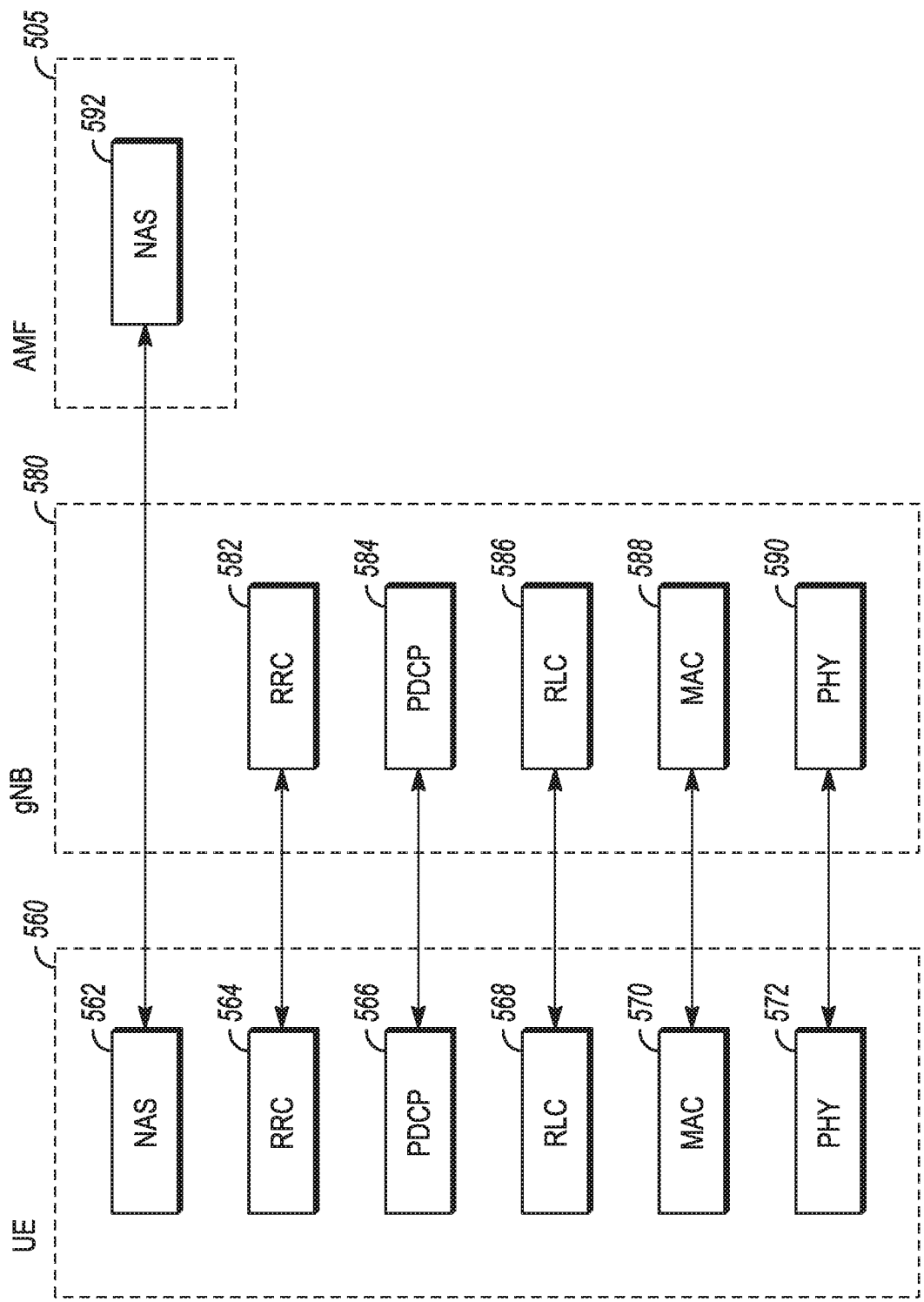
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, $T_s$ may be defined as 1/(30, 720×1000) seconds. According to some aspects, a radio frame may be defined as having duration 30,720. $T_s$, and a slot may be defined as having duration 15,360. $T_s$. According to some aspects, $T_s$ may be defined as $$T_s=1/(\Delta f_{max} \cdot N_f),$$

where $\Delta f_{max}=480\times 10^3$ and Nf=4.096. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK). 16 points, known as quadrature amplitude modulation (QAM) with 16 points (16QAM or QAM 16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i)=d(i)$$

and the layer mapping for two layers may be expressed as:

$$x^{(0)}(i)=d(2i)$$

$$x^{(1)}(i)=d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(i) \ldots x^{(v-1)}(i)]^T$$

where i represents a sequence number index in the range 0 to $M_{symb}^{layer}-1$ the output is represented as a block of vectors:

$$[z^{(0)}(i) \ldots z^{(P-1)}(i)]^T$$

where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j 2\pi f_k (t - T_{sym} - \tau_k)]$$

Where $p_T(t)$ is a prototype filter function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks (RBs) consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, 1) where k is the index number of subcarrier, in the range 0 to N·M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
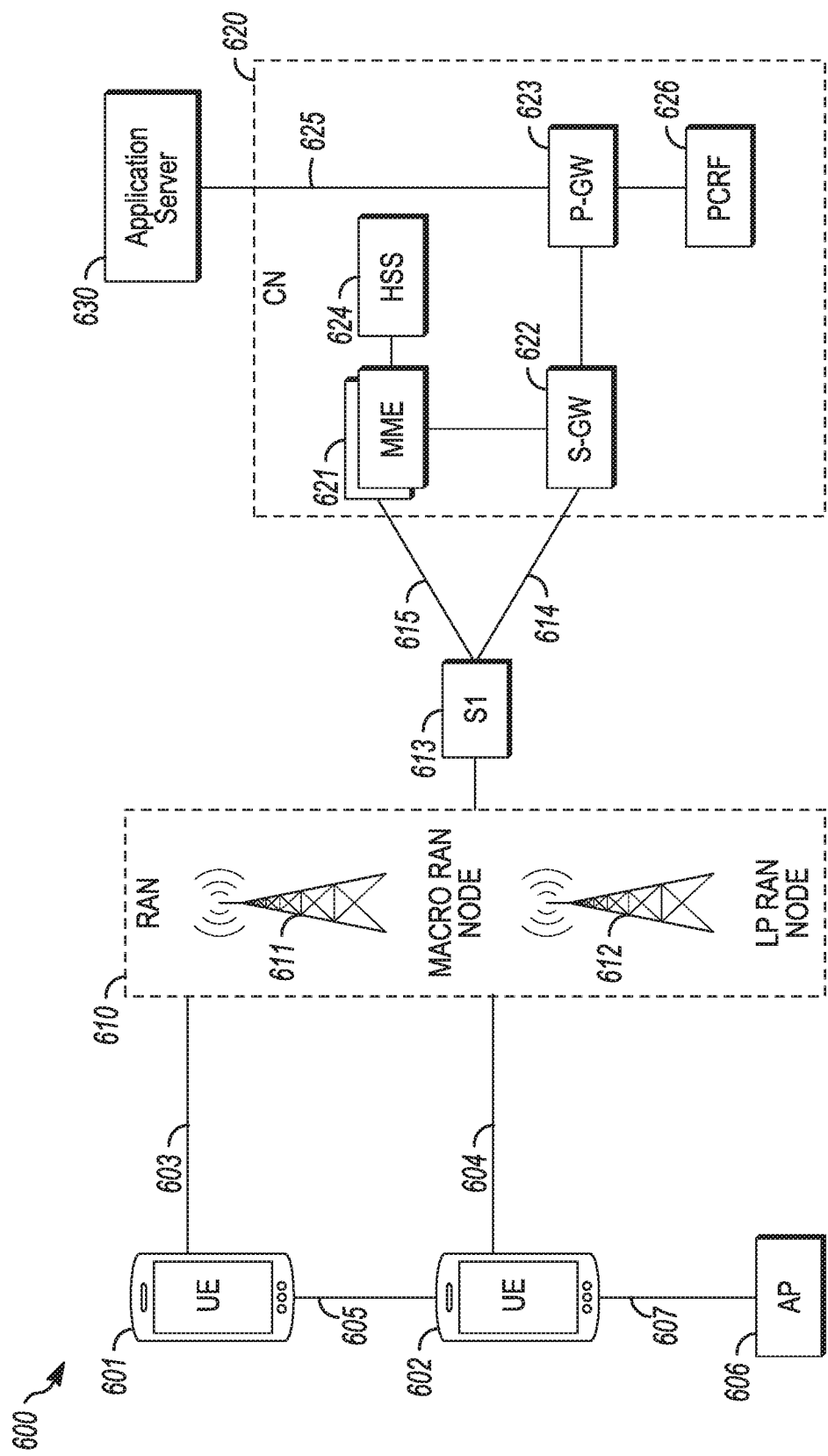
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gigabit NodeBs-gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a 5GC network, or some other type of CN. In this embodiment, the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

As above, changes to the network are currently being examined to more effectively use network resources. In the existing LTE standard, the minimum uplink or downlink resource allocation that may be scheduled for non-narrowband (NB)-IoT UEs is 1 physical resource block (PRB). To improve the PUSCH spectral efficiency for efeMTC, sub-PRB allocation (i.e. resource allocation less than 1 PRB) can be supported. It may therefore be desirable to allocate resources for uplink data transmission (on a physical uplink shared channel (PUSCH)) to MTC UEs with a smaller granularity than 1 PRB across a system bandwidth, or at least a bandwidth available to the MTC UEs. This bandwidth may be significantly larger than that available to NB-IoT UEs, and thus may encounter difficulties in sub-PRB allocation not appreciated in the design of NB-IoT UE sub-PRB allocation, not only in the selection and indication of the desired resource, but also in other communication specifics, such as expansion of the allowable modulation scheme and redundancy version, transport block size, repetition level, downlink control information/uplink control information (DCI/UCI) and RAR design, Demodulation Reference Signal (DMRS), and collision handling and frequency hopping.

It may be desirable to support sub-PRB allocation for a PUSCH to increase the PUSCH spectral efficiency. Specifically, it may be desirable to support a single-tone allocation for PUSCH transmissions with a subcarrier spacing of 3.75 kHz, and a single-tone allocation and multi-tone allocation with 2, 3, 4, 6 or 12 subcarriers with a subcarrier spacing of 15 kHz.

Figure 7:
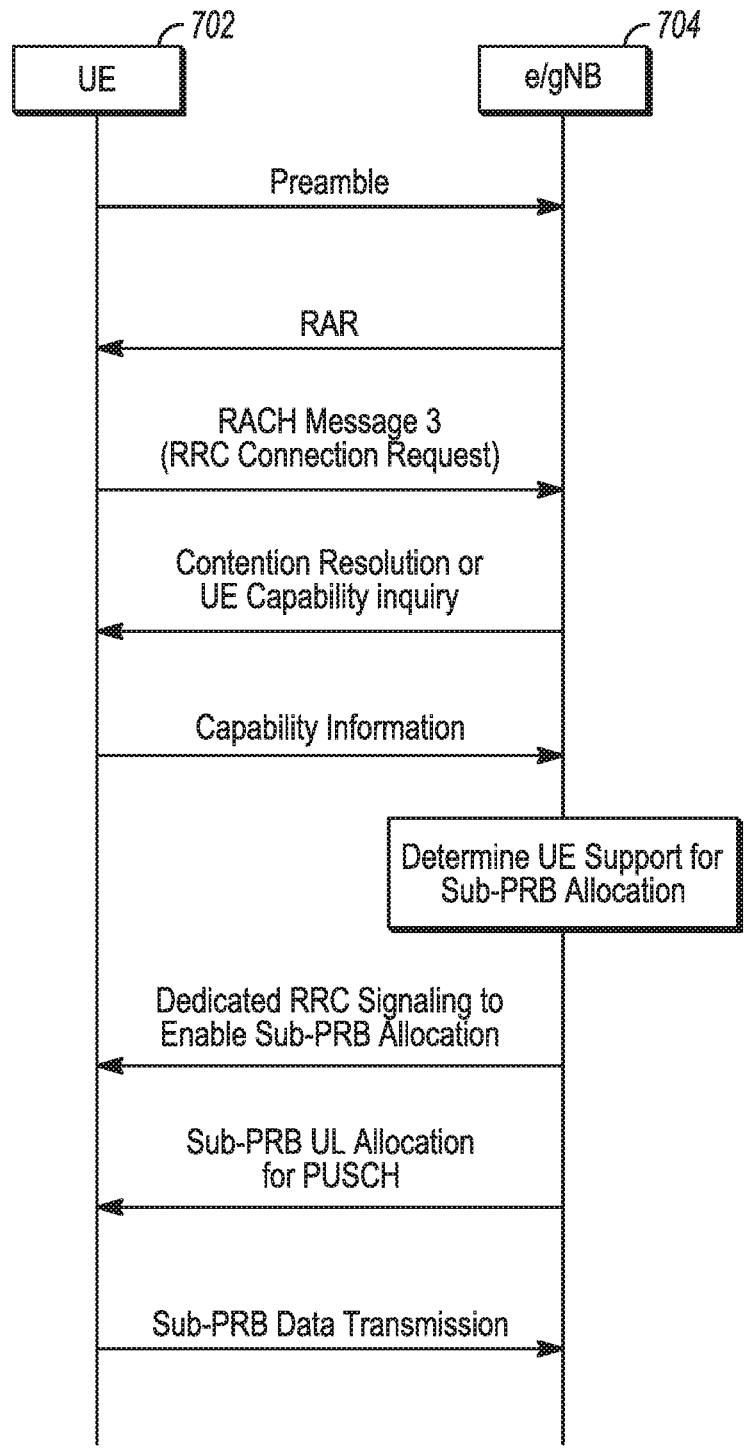
FIG. 7 illustrates connection establishment in accordance with some embodiments.

The support of sub-PRB allocation for the PUSCH can be semi-statically configured via RRC signaling. The configuration can depend on UE capability. FIG. 7 illustrates connection establishment in accordance with some embodiments. The UE 702 and gNB 704 shown in FIG. 7 may be described in any one or more of FIGS. 1-6. Note that although a gNB is referred to, an eNB may be used instead.

The connection establishment shown in FIG. 7 may occur after the UE 702 goes through frequency synchronization and reads the master and system information blocks. The UE 702 may engage in a Random Access Channel (RACH) procedure. The UE 702 may select an available Physical Random Access Channel (PRACH) preamble. The UE 702 may transmit the preamble to the gNB 702 along with the Random Access Radio Network Temporary Identity (RA-RNTI) of the UE 702, which may be determined from the time slot number in which the preamble is sent.

The gNB 704 may transmit a Random Access Response (RAR) to the UE 702 on a downlink shared channel (DL-SCH) addressed to the RA-RNTI. The RAR may contain a temporary cell radio network temporary identity (C-RNTI) for the UE 702 to use in further communications, a timing advance value for the UE 702 to compensate for the round trip delay caused by the distance between the UE 702 and the gNB 704, and an uplink grant resource for the UL-SCH.

The UE 702 may transmit a Random Access Channel (RACH) message 3 after receiving the RAR. The RACH message 3 may contain, for example, a RRC Connection Request, a Tracking Area Update (TAU), or a Scheduling Request (SR), among others. Specifically, the UE 702 may transmit to the gNB 704 a RRC connection request (RRC-ConnectionRequest) during an Attach procedure using the temporary C-RNTI, receive a RRC connection setup message in response and then transmit a RRC connection setup complete (RRCConnectionSetupComplete) message.

The RRC connection request may, in some embodiments, include the UE identity (e.g., TMSI), UE capabilities and a connection establishment cause. In some embodiments, the UE capability information may be provided in a capability information element in a separate RRC message in a PUSCH. The UE 702 can signal its capability for support of sub-PRB PUSCH in its capability information. Until such capability information is received, the gNB 704 may not configure the UE 702 for support of PUSCH with sub-PRB allocation.

The gNB 704 may subsequently transmit to the UE 702 a contention resolution message that may contain a temporary C-RNTI and UE contention resolution ID. The UE 702 may send the UE capability a RRC message in a PUSCH after the contention resolution message (if the contention resolution message is transmitted). Alternatively, the gNB 704 may send a UE capability enquiry to the UE 702, and the UE 702 may in response send the UE capability information to the gNB 704.

After receiving the capability information, dedicated RRC signaling can be used by the gNB 704 to enable sub-PRB allocation. This is to say that, in some embodiments, presence of such dedicated RRC signaling may implicitly indicate that the current cell supports sub-PRB allocation and whether the sub-PRB allocation is enabled for the UE 702. This may permit backward compatibility considering the operation of Rel-15 UEs in earlier networks. The configuration of sub-PRB allocation may take into account (is dependent on) one or more of multiple features such as the maximum PUSCH channel bandwidth (BW), whether (and which) coverage enhancement (CE) mode the UE 702 is using, the minimum value of the repetition level in the set of RLs configured for the PUSCH, and the TDD configuration used.

Afterwards, the gNB 704 may transmit to the UE 702 a sub-PRB allocation for a UL transmission. The UE 702 may then transmit data on the resources indicated by the sub-PRB allocation.

In one embodiment, where the configuration of the sub-PRB allocation depends on the UE capability, before the establishment of the RRC connection, as eNB is not aware of the UE capability yet, the sub-PRB allocation may not be supported, e.g. for Msg3. In some embodiments, on the other hand, it may be possible to support sub-PRB allocation for RACH message 3 for UEs in RRC_CONNECTED mode if, for example, the gNB 704 has previous capability information of the UE stored. In this case, in one example, sub-PRB allocation may be supported only for a PUSCH scheduled by a MTC physical downlink control channel (MPDCCH).

In one embodiment, the configuration of sub-PRB allocation can be jointly configured with other features, such as maximum channel BW. For example, when the maximum PUSCH channel BW is configured to be 5 MHz, the sub-PRB allocation may not be enabled. In one embodiment, the sub-PRB allocation may be supported in both CE mode A (no repetition or small number of repetitions) and CE mode B (large number of repetitions) or may be only supported in only one of CE mode A or CE mode B. For example, sub-PRB allocation may be supported only for CE mode B, as sub-PRB allocation allows more UEs to be multiplexed when larger RLs are used, which may help improve system capacity. In addition, with sub-PRB allocation, the power spectral density (PSD) of the PUSCH transmission increases, which may help improve the coverage. Moreover, in some embodiments, sub-PRB allocation can be supported only when the RLs configured to the UE are large, e.g. when the minimum value of RL in the RRC configured RL values is larger than a predefined integer X, e.g. X=128. Sub-PRB allocation may, in addition, depend on $R_{max}$ in the UE search space, assuming the coverage in UL and DL are almost the same, or may depend on PRACH repetition level.

efeMTC can support a PUSCH subcarrier spacing of 15 kHz and 3.75 kHz. With a 3.75 kHz subcarrier spacing, as defined in Rel-13 NB-IoT transmissions, a 2 ms-long slot can be defined. Each slot may contain 7 symbols. Each symbol may have a cyclic prefix (CP) length of 8.33 μs, and a guard period of 75 μs after the 7 symbols and their CPs. Alternatively, efeMTC may only support a PUSCH subcarrier spacing of 15 kHz.

efeMTC may support a PUSCH allocation with 1, 2, 3, 4, 6, and/or 12 tones. The resource unit (RU) for these tones can be defined as follows, with each RU consisting of X ms:

X=1 for 12 tones with subcarrier spacing of 15 kHz;

X=2 for 6 tones with subcarrier spacing of 15 kHz, if 6-tone allocation is supported;

X=4 for 3 tones with subcarrier spacing of 15 kHz, if 3-tone allocation is supported;

X=8 for a single tone with subcarrier spacing of 15 kHz, if a single tone is supported;

X=32 for a single tone with subcarrier spacing of 3.75 kHz, if a subcarrier spacing of 3.75 kHz is supported.

In some embodiment, additional allocations such as 2-tone and/or 4-tone allocations can be supported for efeMTC, with X=4 or 6 for 2 tones and X=3 for 4 tones with a subcarrier spacing of 15 kHz. The resource allocation may be indicated by up to 6 bits for subcarrier indication and 3 bits for indicating the number of RUs in DCI format NO. The 3 bits for indication of the number of RUs can be reused for efeMTC, where {0, 1, 2, 3, 4, 5, 6, 7} may indicate {1, 2, 3, 4, 5, 6, 8, 10} RUs, respectively.

The indication of sub-PRB allocation may be indicated in various ways. In a first alternative, 1 bit may be used as a sub-PRB flag. This may be added to indicate if the allocation is sub-PRB allocation or allocation in units of PRBs. If the bit indicates the resource allocation in units of PRB, the resource allocation method can follow Rel-14 feMTC. If the bit indicates the sub-PRB allocation, the resource allocation can be indicated by NB index+PRB in a NB+subcarrier indication within the PRB. The NB index can be indicated via $\lceil \log_2 \lfloor (N_{RB}^{UL}/6) \rfloor \rceil$ bits, where $N_{RB}^{UL}$ is the number of UL PRBs in the system.

A PRB indication within the NB can be indicated in a number of ways. In a first embodiment (R1), the PRB can be indicated explicitly via 3 bits. In a second embodiment (R2), implicit indication can be used. In this case, a predefined or RRC configured PRB, such as either the starting or the ending PRB of the NB, may always be used. In a third embodiment (R3), 1 bit may be used to indicate if the PRB is the starting or ending PRB of the NB. Alternatively, N candidate PRBs can be predefined, and $\lceil \log_2 N \rceil$ bits can be used to select one from the N candidates. For example, N=1 may be used to indicate the PRBs used out of the first 2 (or last 2) PRBs in the NB. As another example, N=2 may be used to indicate the PRBs out of the first (or last) 4 PRBs in the NB.

A variety of methods may be used for the subcarrier indication. In a first embodiment (S1), if only subcarrier spacing of 15 kHz is supported, bits to indicate the set of allocated subcarriers can be used. The indication can follow Rel-13 NB-IoT, as illustrated in Table 1, with subcarrier indication field being from 0 to 31. Alternatively, $I_{sc}=18$ can also be reserved as a 1-PRB allocation can be indicated via a Rel-13 eMTC resource allocation, by setting a 1-bit sub-PRB flag to be allocation in units of PRB. The $I_{sc}$ may be the subcarrier indication in the DCI.

In a second embodiment (S2), if only a subcarrier spacing of 15 kHz, and a 3-tone, 6-tone or 12-tone allocation are supported, 3 bits can be used to indicate the set of allocated subcarriers, to include allocations corresponding to $I_{sc}$ of 12-17 in Table 1. Alternatively, a group of 3 subcarriers can be defined, i.e., SC {0, 1, 2}, {3, 4, 5}, {6, 7, 8} and {9, 10, 11}. A bitmap of 4 bits can be used. As another method, 2 bits can be used to indicate the 3-subcarrier group and 1 bit to indicate if the allocation is a 3-tone or 6-tone allocation.

If the allocation is a 6-tone allocation, it can be predefined that the following 3-subcarrier group or the previous group can be allocated together.

In a third embodiment (S3), if only a subcarrier spacing of 15 kHz, and a 3-tone or 6-tone allocation are supported, 2 bits can be used to indicate the set of allocated subcarriers, to include allocations corresponding to $I_{sc}$ of 12-15 if 3-tone is supported and 16-17 if 6-tone is supported in Table 1. In this method, the number of bits used for resource allocation may be the same as in Rel-13 eMTC.

In a fourth embodiment (S4), if both subcarrier spacing of 3.75 kHz and 15 kHz are supported, 6 bits can be used. This is the same as Rel-13 NB-IoT subcarrier indication.

In a fifth embodiment (S5), to limit the number of bits used for subcarrier indication, a subset of subcarrier allocations from Rel-13 NB-IoT can be selected, depending on the CE mode. For example, to have N bits for subcarrier indication: in CE mode A (if sub-PRB is supported for this CE mode), N can be 5, for indication of subcarrier allocations corresponding to $I_{sc}$ of 0-17 in Table 1 for subcarrier spacing of 15 kHz, and for indication of a single tone selected from a predefined/configured set of 32 tone indexes for subcarrier spacing of 3.75 kHz, where the predefined set can be any subset of $\{0, 1, \ldots, 47\}$ with 32 elements, e.g. $\{0, 1, \ldots, 31\}$. As another example, N can be 2, for indication of subcarrier allocations corresponding to $I_{sc}$ in Table 1 for subcarrier spacing of 15 kHz, where $I_{sc}$ is from a predefined/configured set that can be any subset of $\{0, 1, \ldots 17\}$ with 4 elements (e.g. $\{12, 13, 14, 15\}$ or $\{0, 12, 16, \text{reserved}\}$), and for indication of a single tone selected from a predefined/configured set of 4 values for subcarrier spacing of 3.75 kHz, where the set of 4 values can be any subset of $\{0, 1, \ldots, 47\}$ with 32 elements, e.g. $\{0, 1, \ldots, 31\}$.

In CE mode B (if sub-PRB is supported for this CE mode), N can be 1, for indication of subcarrier allocations corresponding to $I_{sc}$ in Table 1 for subcarrier spacing of 15 kHz, where $I_{sc}$ is from a predefined/configured set that can be any subset of $\{0, 1, \ldots, 17\}$ with 2 elements (e.g. $\{12, 13\}$, $\{0, 12\}$, $\{0, 16\}$, $\{12, 16\}$, etc.), and for indication of a single tone selected from a predefined/configured set for subcarrier spacing of 3.75 kHz, where the predefined set can be any subset of $\{0, 1, \ldots, 47\}$ with 2 elements, e.g. $\{0, 24\}$ or $\{0, 47\}$. As another example, N can be 2, for indication of subcarrier allocations corresponding to $I_{sc}$ in Table 1 for subcarrier spacing of 15 kHz, where $I_{sc}$ is from a predefined/configured set that can be any subset of $\{0, 1, \ldots, 17\}$ with 4 elements (e.g. $\{12, 13, 14, 15\}$ or $\{0, 12, 16, \text{reserved}\}$), and for indication of a single tone selected from a predefined/configured set of 4 values for subcarrier spacing of 3.75 kHz, where the set of 4 values can be any subset of $\{0, 1, \ldots, 47\}$ with 32 elements, e.g. $\{0, 1, \ldots, 31\}$.

TABLE 1

Allocated subcarriers for NPUSCH with subcarrier spacing of 15 kHz, within 1 PRB. The $I_{sc}$ is the subcarrier indication in DCI.

| Subcarrier indication field ($I_{sc}$) | Set of Allocated subcarriers ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-63 | Reserved |

The PRB indication may instead be indicated via a second alternative. There are $2\lceil \log_2 \lfloor (N_{UL}^{RB}/6) \rfloor \rceil \times 11$ states that is not used in Rel-13 eMTC CE mode A PUSCH allocation. If the sub-PRB allocation is supported only for a maximum PUSCH channel BW of 1.4 MHz, the $2\lceil \log_2 \lfloor (N_{UL}^{RB}/6) \rfloor \rceil \times 11$ states can be used for sub-PRB indication. The NB index can be indicated via $\log_2 \lfloor (N_{RB}^{UL}/6) \rfloor$ bits. The remaining 11 states can be used to indicate the PRB index within the NB or the subcarrier indication. In one embodiment, 6 out of 11 states can be used for PRB indication within the NB. Alternatively, the embodiments R1-R3 above can be used.

If the 11 states are not used for PRB indication, the states can be used for subcarrier indication. In one example, the 11 states can be used to indicate a subset of subcarrier allocations corresponding to $I_{sc}$ of 0-17 in Table 1. In one example, the 11 states can be used to indicate the set or subset of subcarrier allocations corresponding to $I_{sc}$ of 12-17 in Table 1. In another example, the 11 states can be used to indicate the subcarrier allocations corresponding to $I_{sc}$ of 12-17 in Table 1, and five subcarrier allocations corresponding to $I_{sc}$ from set $\{0, 1, \ldots, 11\}$, e.g. $I_{sc} \in \{0, 2, 4, 6, 8\}$. Alternatively, the embodiments S1-S5 above can be used for subcarrier indication.

In one embodiment, the 11 states can be used to indicate 5 allocations with 2 tones, e.g. $\{0,1\}$, $\{2,3\}$, $\{4,5\}$, $\{6,7\}$, $\{8,9\}$, and also 6 allocations corresponding to $I_{sc}$ of 12-17 in Table 1. In another embodiment, the 11 states can be used to indicate the allocations with subcarriers $\{0, 1, 2, 3\}$. $\{4,5,6,7\}$, or $\{8,9,10,11\}$, and the subcarrier allocations corresponding to $I_{sc}$ of 12-17 in Table 1. In another embodiment, the 11 states can be used to indicate subsets with N1 resource allocations from subcarrier allocations corresponding $I_{sc}$ of 12-17 in Table 1, and subsets with N2 resource allocations from allocations $\{0,1,2,3\}$, $\{4,5,6,7\}$, $\{8,9,10,11\}$, $\{0,1\}$, $\{2,3\}$, $\{4,5\}$, $\{6,7\}$, $\{8,9\}$, $\{10,11\}$, where N1+N2=11. For example, we can have N1=6 and N2=5 for indication of $I_{sc}$ of 12-17 in Table 1, and subcarrier allocation of $\{0,1,2,3\}$, $\{4,5,6,7\}$, $\{8,9,10,11\}$, $\{0,1\}$. $\{2,3\}$.

The PRB indication may instead be indicated via a third alternative. In this method, 1 bit may be added as a sub-PRB flag to indicate if the allocation is sub-PRB allocation or allocation in units of PRBs. If the bit indicates the resource allocation in units of PRB, the resource allocation method can follow Rel-14 feMTC. If the bit indicates a sub-PRB allocation, the resource allocation can be indicated by NB index+subcarrier indication within the NB. There are in total 72 subcarriers with subcarrier spacing of 15 kHz, and 288 subcarriers with subcarrier spacing of 3.75 kHz in one NB.

N bits can be used for the subcarrier indication. For an indication of allocation with a subcarrier spacing of 3.75 kHz, 9 bits can be used to indicate tone index from $\{0, 1, \ldots, 287\}$. Fewer bits can instead be used by restricting the possible tone index. For example, N=7 may be used to indicate tone index from $\{0, 1, \ldots, 127\}$, or N=6 may be used to indicate tone index from $\{0, \ldots, 65\}$.

In another embodiment, for an indication of allocation with subcarrier spacing of 15 kHz, 7 bits can be used for indication of single-tone, 3-tone and 6-tone allocations with a subcarrier spacing of 15 kHz, to cover a single-tone allocation with tone index from $\{0, 1, \ldots, 71\}$, 3-tone allocations with $\{3x, 3x+1, 3x+2\}$ where $x \in \{0, 1, \ldots, 23\}$, and 6-tone allocations with $(6x, 6x+1, \ldots, 6x+5)$ where $x \in \{0, 1, \ldots, 11\}$. In another embodiment, 8 bits can be used for indication of single-tone, 3-tone and 6-tone allocations with a subcarrier spacing of 15 kHz to cover a single-tone allocation with tone index from $\{0, 1, \ldots, 71\}$, 3-tone allocations with $\{x, x+1, x+2\}$ where $x \in \{0, 1, \ldots, 69\}$, and 6-tone allocations with $\{x, x+1, \ldots, x+5\}$ where x $\{0, 1, \ldots, 66\}$. Fewer bits can also be used by restricting the number of possible allocations. For example, N=6 to indicate single-tone allocation with tone index from {0, 1, . . . , 35}, 3-tone allocations with {3x, 3x+1, 3x+2} where x∈{0, 1 . . . . , 11}, and 6-tone allocations with {6x, 6x+1, . . . , 6x+5} where x∈{0, 1, . . . , 11}.

The PRB indication may instead be indicated via a fourth alternative. In this method, 1 bit may be added as sub-PRB flag to indicate if the allocation is sub-PRB allocation or allocation in units of PRBs. If the bit indicates the resource allocation in units of PRB, the resource allocation method can follow Rel-14 feMTC. If the bit indicates the sub-PRB allocation, the resource allocation can be indicated by subcarrier indication within the whole system BW. Note that with this method, the number of bits used may be quite large. For example, with system BW of 10 MHz, there are 600 subcarriers with subcarrier spacing of 15 kHz and 2400 subcarriers with subcarrier spacing of 3.75 kHz. If it is desired to indicate a single tone allocation with full flexibility, 10 and 12 bits may be used for a subcarrier spacing of 10 and 12 bits, respectively.

In another embodiment, $\lceil \log_2(N_{SC}/3+N_{SC}/6) \rceil$ bits can be used for indication of 3-tone allocations with {3x, 3x+1, 3x+2} where x∈{0, 1 . . . , $N_{SC}/3-1$}, and 6-tone allocations with {6x, 6x+1, . . . , 6x+5} where x∈{0, 1, . . . , $N_{SC}/6-1$}, where $N_{SC}$ is the number of subcarriers in the system. For example, with 10 MHz system BW and subcarrier spacing of 15 kHz, the number of bits used for this embodiment is 9 bits.

The PRB indication may instead be indicated via a fifth alternative. In this method, sub-PRB allocation can RRC configured such that when sub-PRB allocation is enabled, the UE may only support up to 1 PRB allocation. Then the 1-bit sub-PRB flag in the first four alternatives above can be removed, while the other bits for the indication alternatives above can still be used.

Note that as elaborated below, a 1 bit in the Redundancy Version (RV) field may be re-interpreted, e.g. to be used for resource allocation in case of CE mode A. By re-interpreting the bit and selecting appropriated alternatives above, the size of DCI may be the same as Rel-13 eMTC.

Also note that the number of bits used for PRB and subcarrier indication in alternatives 1-3 may be calculated assuming the NB has 6 PRBs. In some embodiments, the NB can be re-defined to have X PRBs, with X different from Rel-13 eMTC, e.g. X=3. Then the number of bits used for PRB and subcarrier indication are to be scaled correspondingly.

Besides the above methods to indicate the subcarrier indication, Y bits may be used for resource assignment, e.g. Y=3 as in Rel-13 NB-IoT to indicate number of resource units from {1, 2, 3, 4, 5, 6, 8 and 10}. Alternatively, different number of bits can be used for CE mode A and CE mode B, e.g. Y=3 for CE mode A and Y=1 for CE mode B, or Y=2 for CE mode A and Y=0 for CE mode B.

All combinations of the above methods may be possible. Some examples are provided below, for cases where sub-PRB allocation is supported only for CE mode B, 3-tone and 6-tone sub-PRB allocations and subcarrier spacing of 15 kHz.

In a first example, when sub-PRB allocation is supported only for CE mode B, and UEs with max 1.4 MHz PUSCH BW. The resource allocation may be indicated via a 1-flag bit for indication of sub-PRB allocation or not, $\lceil \log_2\lfloor (N_{RB}^{UL}/6) \rfloor \rceil$ bits for NB indication, and 3 bits for sub-PRB allocation within the first (or last) PRB of the NB, if 1-flag bit indicates the sub-PRB allocation. The 3 bits can be used for indication of allocations with subcarriers {0, 1,2}, {3, 4, 5}, {6, 7, 8}, {9, 10, 11}, {0, 1, . . . , 5} and {6, 7, . . . , 11}.

In a second example, sub-PRB allocation may be supported only for CE mode B, and UEs with a maximum 1.4 MHz PUSCH BW. The resource allocation may be indicated via 1-flag bit for indication of sub-PRB allocation or not, $\lceil \log_2\lfloor (N_{RB}^{UL}/N) \rfloor \rceil$ bits for N-PRB group indication, and 3 bits for sub-PRB allocation within the first (or last) PRB within the N-PRB group, if 1-flag bit indicates the sub-PRB allocation. N can be 12 or 24 for example. The 3 bits can be used for indication of allocations with subcarriers {0, 1, 2}, {3, 4, 5}, {6, 7, 8}, {9, 10, 11}, {0, 1, . . . , 5} and {6, 7, . . . , 11}.

In a third example, sub-PRB allocation may be supported only for CE mode B, and UEs with a maximum 1.4 MHz PUSCH BW. The resource allocation may be indicated via 1-flag bit for indication of sub-PRB allocation or not, $\lceil \log_2\lfloor (N_{RB}^{UL}/6) \rfloor \rceil$ bits for NB indication, n bits to indicate one out of the first $2^n$ (or last $2^n$ in one example) PRBs in the NB, and 3 bits for sub-PRB allocation within indicated PRB, if 1-flag bit indicates the sub-PRB allocation. The 3 bits can be used for indication of allocations with subcarriers {0, 1, 2}, {3, 4, 5}, {6, 7, 8}, {9, 10, 11}, {0, 1, . . . , 5} and {6, 7, . . . , 11}. In some embodiments, n can be 1 or 2.

Turning to modulation, various embodiments may be used. In one embodiment, when the resource allocation is no less than 1 PRB, the MCS field may be interpreted as in Rel-13 eMTC. For example, in CE mode B, only QPSK may be used. When the allocated resource is less than 1 PRB, only QPSK may be supported for multi-tone transmission. For a single-tone transmission, as Rel-13 NB-IoT, phase rotated versions of BPSK and QPSK (π/2 BPSK and π/4 QPSK) can be supported to reduce PAPR. Table 16.5.1.2-1 in TS 36.213 (replicated below) can be used for single-tone transmission MCS determination.

TABLE 16.5.1.2-1

Modulation and TBS index table for NPUSCH with $N_{sc}^{RU}$ = 1.

| MCS Index $I_{MCS}$ | Modulation Order $Q_m$ | TBS Index $I_{TBS}$ |
|---|---|---|
| 0 | 1 | 0 |
| 1 | 1 | 2 |
| 2 | 2 | 1 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |

In another embodiment, the modulation for 1-PRB allocation and sub-PRB allocation with multiple tones always uses QPSK, while modulation for single-tone transmission is determined based on Table 16.5.1.2-1 in TS 36.213. The resource allocation for multiple PRBs can follow Rel-13 eMTC.

The redundancy version (RV) for resource allocation ≥1 PRB follows Rel-13 eMTC. For a PUSCH with <1 PRB allocation, the supported RV can follow the Rel-13 eMTC, with 4 RVs. Alternatively, the RV can follow Rel-13 NB-IoT, i.e., only two RVs can be used, e.g. RV0 and RV2. The number of RVs supported for PUSCH with 1 PRB allocation and for PUSCH with <1 PRB allocation might be different.

The choice of the cycling of the RVs may include that the RV is changed per subframe, or per RU, e.g. 1 ms for 12-tone PUSCH, 2 ms for 6-tone PUSCH, 4 ms for 3-tone PUSCH, or 8 ms for single-tone PUSCH (if supported), or every (number of RUs*number of ms per RU). Alternatively, the RV may be changed every $Z*N_{RU}$ RUs, where Z=min{4, repetitions/N}, where N is the number of supported RVs, $N_{RU}$ is the number of allocated RUs for the PUSCH transmission, and the number of repetitions is as indicated in the UL grant.

Alternatively, in each cycle of one RV, each subframe (or NB-slot if introduced to support a smaller subcarrier spacing) in the allocated resources may be repeated consecutively for Z times. In one embodiment, Z=min{M, repetition/N}, where M and N is an integer number e.g. M=4, N=2 or N=4. This can be applied to all sub-PRB allocations, or only to multi-tone sub-PRB allocations. In some examples, M and N can have different values for FDD and TDD, e.g. M=4 for FDD and M=5 for TDD. In one embodiment, Z=1. This can be applied to all sub-PRB allocations, or only a single-tone transmission.

Alternatively, the RV may be changed per 4 subframes or 4 RUs or 4 (number of RUs*number of SFs per RU) in FDD, and 5 subframes or 5 RUs or 5 (number of RUs*number of SFs per RU) in TDD. Note that in different CE modes, PUSCHs with different numbers of RB/subcarriers allocations may use different RV cycling methods. In one embodiment, for a PUSCH with an allocation of no less than 1 PRB, the RV cycling may follow Rel-13 eMTC, i.e., the first RV cycling method above for CE mode A and last RV cycling method above for CE mode B. For a PUSCH with an allocation of less than 1 PRB, the $2^{nd}$ RV cycling method may be used.

TABLE 2

Transport block size (TBS) table for PUSCH

| $I_{TBS}$ | $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | |
| 8 | 120 | 256 | 392 | 536 | 680 | 808 | | |
| 9 | 136 | 296 | 456 | 616 | 776 | 936 | | |
| 10 | 144 | 328 | 504 | 680 | 872 | 1000 | | |
| 11 | 176 | 376 | 584 | 776 | 1000 | | | |
| 12 | 208 | 440 | 680 | 1000 | | | | |

In some embodiments, the TBS table for a PUSCH with a sub-PRB allocation can follow Rel-13 NB-IoT TBS Table 2 above. Alternatively, Table 3 can be used if the UE can support a larger PUSCH TBS. For example, if CE mode A supports sub-PRB allocation, larger TBS can be supported, depending on the UE capability.

TABLE 3

Transport, block size (TBS) table for PUSCH

| $I_{TBS}$ | $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 968/1000 | 1032 |
| 8 | 120 | 256 | 392 | 536 | 680 | 808 | 1096 | 1224 |
| 9 | 136 | 296 | 456 | 616 | 776 | 936 | 1256 | 1384 |
| 10 | 144 | 328 | 504 | 680 | 872 | 1032/1000 | 1384 | 1544 |
| 11 | 176 | 376 | 584 | 776 | 1000 | 1192 | 1608 | 1736 |
| 12 | 208 | 440 | 680 | 904/1000 | 1128 | 1352 | 1800 | 2024 |

In another embodiment, the supported RU can be smaller than that of Rel-13 NB-IoT. For example, only $I_{RU}<=X$ may be supported, e.g. X=0, 1 or 3 in different embodiments. In this case, TBS Table 2 can be punctured, by only including the columns corresponding to $I_{RU}<=X$. In one embodiment, the supported RU can be different between CE mode A and CE mode B. For example, $I_{RU} \leq X_a$ for CE mode A and only $I_{RU}=X_b$ for CE mode B, where $X_a$ can be 3 and $X_b$ can be 0, 1, 2 or 3. In some embodiments, the set of supported to number of RUs can be predefined or RRC configured.

Turning to the RL for sub-PRB allocation (the number of PUSCH repetitions), in one embodiment, the supported RL for sub-PRB allocation can be the same as Rel-13 NB-IoT, i.e. 1, 2, 4, 8, 16, 32, 64, and 128, indicated by 3 bits in DCI. Alternatively, larger RLs can be supported. The indication can follow Rel-13 eMTC, where RRC configures a subset of candidate RLs, and the DCI selects one of the candidates. In this embodiment, the UE may assume that the total transmission duration, which can be calculated by the number of RUs multiplied by the number of subframes per RU multiplied by the number of repetitions, may not exceed the maximum total number of (valid) subframes of transmission defined for CE mode A and CE mode B. If the scheduled total transmission duration is more than the maximum total number of valid subframes of transmission (32 for CE mode A and 2048 for CE mode B), the UE may consider this as an error case and drop this transmission.

In another embodiment, the RL can be scaled down with respect to the number of RUs. For example, the RRC messaging may configure the potential set of RLs, with the possible value i within the set denoted by R. When sub-PRB is enabled and scheduled number of RU is $N_{RU}$, the RL can be re-interpreted by $\lceil R/N_{RU}\rceil$ or by the supported RL in existing eMTC/NB-IoT systems that is closest to $R/N_{RU}$.

To reduce the number of bits used for the RL, in one example, the RRC signaling may configure 8 possible values for CE mode B. In this case, however, when sub-PRB allocation is enabled, in some embodiments only the largest 4 values may be used, and the RL may be interpreted as the RL in one embodiment, or $RL/N_{RU}$ in another embodiment, where the RL is the value configured by RRC signaling. Alternatively, the RRC signaling may separately configure a set of RLs for sub-PRB allocation when enabled. The values can be selected from the RLs supported in Rel-13 NB-IoT.

The DCI design, meanwhile, can use DCI format 6-0A or 6-0B or N0 as a baseline. A new DCI format can be introduced, possibly with more bits in resource allocation fields compared to DCI format 6-0A/6-0B/N0. The resource allocation fields, MCS, RL and/or RV fields may be changed, depending on the designs above.

For example, a new DCI format can be introduced, where one of multiple of the following fields can be included. A flag may be used for sub-PRB allocation—1 bit, where value 0 indicates resource allocation no less than 1 PRB, and value 1 indicates sub-PRB allocation. A resource block assignment—$\lceil \log_2\lfloor(N_{RB}^{UL}/6)\rfloor\rceil+Z+X$ bits for PUSCH may be used as defined in [3]. The resource block assignment may have $\lceil \log_2\lfloor(N_{RB}^{UL}/6)\rfloor\rceil$ MSB bits to provide the narrowband index as defined in section 5.2.4 of [2], X bits to indicate the PRBs within the NB, e.g. X=1 to select 1 PRB out of 2 first (or last in another embodiment) PRBs in the NB, and X=2 to select 1 PRB out of first (or last in another embodiment) 4 PRBs in the NB. If the PRB for the sub-PRB allocation is explicitly indicated (e.g. predefined or semi-statically configured), X may be 0. Z bits may be used to to provide the subcarrier allocation, e.g. Z=3 for indication of allocation from subcarriers {0, 1, 2}, {3, 4, 5}, {6, 7, 8}, {9, 10, 11}, {0, 1, ... , 5}, {6, 7, ... , 11} in a predefined/configured PRB within the indicated NB, and 2 spare states can be reserved or be used to indicate resource allocation in unit of PRB (e.g., allocating one or two predefined/configured PRBs within the NB, or allocating one out of two candidate PRBs within the NB). A modulation and coding scheme may be provided via the DCI in which 4 bits indicate the TBS index $I_{TBS}$ if sub-PBR allocation is used.

The DCI may also indicate a resource unit assignment—Y bits to indicate number of RUs $N_{RU}$. For example, Y=3 to follow Rel-13 NB-IoT. Y=2 to support $N_{RU}$ from {1, 2, 3, 4}, Y=1 to support $N_{RU}$ from {1, 2} or Y=0 for the case that $N_{RU}$ is always 1.

The DCI may also indicate the repetition number—R bits to indicate the repetition number. For example, R=3 to follow Rel-13 NB-IoT, R=2 to select one RL out of 4 potential RLs configured by RRC signalling, or R=1 to select one RL out of 2 potential RLs configured by RRC signalling.

The DCI may also use 1 bit to indicate the HARQ process number, 1 bit as a new data indicator (new transmission or retransmission), 2 bits as a DCI subframe repetition number. Further, a redundancy version may be indicated as—0 (in one CE mode B embodiment), 1 bit (in embodiment that reuses NB-IoT), or 2 bits (in embodiment that reuses eMTC CE mode A). Note that the number of bits above are just some examples, while other integer numbers are not precluded. The number of bits above can be different for CE mode A and CE mode B: for example, X=0, Z=3 and Y=2 for CE mode A and X=0, Z=3 and Y=0 or 1 for CE mode B.

The DMRS design for sub-PRB allocation in Rel-13 NB-IoT can be used. Specifically, a DMRS sequence with length 6 and length 3 can be introduced for a 6-tone and 3-tone PUSCH transmission, respectively, at the same symbol location as LTE DMRS for PUSCH. For a single tone PUSCH, a DMRS with length of 16 may be mapped to the 4$^{th}$ symbol in each slot within duration of 8 ms and to 5$^{th}$ symbol in each 2 ms-NB-slot within duration of 32 ms for subcarrier spacing of 15 kHz and 3.75 kHz, respectively. The LTE Gold sequence may be used for a single-tone DMRS.

For 2-tone and 4-tone PUSCH transmission, a DMRS sequence with length 2 and length 4 can be introduced. In one embodiment, the sequence can be punctured from a 3-tone, 6-tone or 12-tone DMRS sequence. Alternatively, new sequences can be defined, e.g.:

$$r(n)=e^{j\alpha n}e^{j\varnothing(n)\pi/4}, 0\leq n\leq N,$$

where $\alpha$ determines the cyclic shift with $0\leq\alpha\leq 2$ for 2-tone based DMRS and $0\leq\alpha\leq 4$ for 4-tone based DMRS, N is the length of the DMRS sequence, and $\varnothing(n)$ can be determined by a predefined table, with different combinations of {1, −1, 3, −3}. The selected combinations may have low cross-correlation and good self-correlation properties. For example, for 4-tone allocation, a subset of $\varnothing(n)$ listed in Error! Reference source not found, can be used, where the selected rows have low cross-correlation and good self-correlation properties. A similar method can be used for 2-tone DMRS.

TABLE 4

Example of definition of $\varnothing(n)$

| Possible u | $\phi(0) \ldots \phi(3)$ | | | |
|---|---|---|---|---|
| 0 | 1 | 1 | 1 | 1 |
| 1 | 1 | 1 | 1 | −1 |
| 2 | 1 | 1 | 1 | 3 |
| 3 | 1 | 1 | 1 | −3 |
| 4 | 1 | 1 | −1 | 1 |
| 5 | 1 | 1 | −1 | −1 |
| 6 | 1 | 1 | −1 | 3 |
| 7 | 1 | 1 | −1 | −3 |
| ... | | ... | | |
| 251 | −3 | −3 | 3 | −3 |
| 252 | −3 | −3 | −3 | 1 |
| 253 | −3 | −3 | −3 | −1 |
| 254 | −3 | −3 | −3 | 3 |
| 255 | −3 | −3 | −3 | −3 |

In another embodiment, the single tone DMRS can still use a Zadoff-Chu (ZC) sequence of length 13 with a cyclic extension to 16. The mapping of the single tone DMRS can follow the above embodiment.

In one embodiment, the DMRS density can be increased. For example, the density of DMRS can be increased N times, e.g. N=2. For N=2, the DMRS can be located in any 4 symbols out 14 symbols per subframe, e.g. symbols 0, 3, 7, 10. The denser DMRS can be applied to sub-PRB allocation only, or may be applied to both sub-PRB allocation and PRB allocation in units of 1 PRB. As another example, the denser DMRS can be applied to a single-tone transmission only, or a multi-tone transmission only, or both. The denser DMRS can be applied to a PUSCH with an allocation of no more than X tones, or alternatively with an allocation of no less than Y tones.

The use of denser DMRS can be configured by higher layer signaling or indicated by the DCI. Alternatively, the use of denser DMRS can be implicitly indicated, depending on the number of RUs and/or number of repetitions, and/or the number of scheduled subcarriers/PRBs. For example, denser DMRS may be used only when the scheduled number of repetitions is no less than R, where R can be predefined or configured (e.g. by higher layer signaling). As another example, the denser DMRS may be used when the total scheduled transmission duration is longer than T, where the total transmission duration can be calculated by number of subframes per RU*number of allocated RUs*number of repetitions. The parameter T can be predefined, e.g. T=1024 or 1536, or signaled by higher layer signaling.

The Random Access Response (RAR) may also be adjusted for sub-PRB allocations. In one embodiment, the sub-PRB allocation may be supported only for a PUSCH scheduled by a MPDCCH. Alternatively, the RAR message 3 may support sub-PRB allocation. Thus, the RAR design may be modified to support sub-PRB allocation using RAR message 3. Note that when the UE initially accesses the network, the RRC connection has not been built and eNB may not know whether or not the UE has the capability to support a sub-PRB allocation. Thus, in one example, the eNB may only configure a sub-PRB allocation for RAR Msg 3 when the UE is in RRC_CONNECTED mode. Alternatively, the eNB may configure the sub-PRB allocation for UEs that have already connected to the network and indicated their capability for support of sub-PRB allocation.

Table illustrates the RAR grant content for Rel-13 eMTC UEs, which is defined in TS 36.213. To extend the RAR grant to support sub-PRB allocation, a number of modifications can be considered. 1 bit may be used to indicate the subcarrier spacing, e.g. 0 for 3.75 kHz and 1 for 15 kHz, if both numerologies are supported. If only 15 kHz is supported, this field may not be used. 1 bit may be used to indicate if the resource allocation is a sub-PRB allocation or a resource allocation in units of 1 PRB.

TABLE 5

Random Access Response Grant Content field size

| DCI contents | CEmodeA | CEmodeB |
|---|---|---|
| Msg3 PUSCH narrowband index | $N_{NB}^{index}$ | 2 |
| Msg3 PUSCH Resource allocation | 4 | 3 |
| Number of Repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | 4 - $N_{NB}^{index}$ | 0 |
| Total Nr-bits | 20 | 12 |

For Msg3 PUSCH resource allocation, a resource allocation in units of 1 PRB can the Rel-13 eMTC design. For sub-PRB resource allocation, a number of methods can be considered. In a first embodiment, sub-PRB allocation for Msg3 may be supported only when the corresponding detected PRACH is from a PRACH coverage enhancement level 2 or 3.

In a second embodiment, the same number of bits may be used for Msg3 PUSCH resource allocation by reinterpreting for sub-PRB allocation. For example, with 4 bits in CE mode A, the N1 single-tone allocations, N2 two-tone allocations, N3 three-tone allocations, N4 four-tone allocations, and N6 six-tone allocations, with N1+N2+N3+N4+N6=16 can be indicated, where N1, N2, N3, N4, and N6 can be any integers from {0, 1, ..., 16}, e.g., {N1=0, N2=0, N3=0, N4=0, N6=12} for a resource allocation of {6x, 6x+1, ..., 6x+5} with x=0, 1, ..., 11, and {N1=0, N2=0, N3=12, N4=0, N6=4} for a resource allocation of {3x, 3x+1, 3x+2} with x=0, 1, ..., 11 and {6x, 6x+1, ..., 6x+5} with x=0, 1, 2, 3. As another example, {N1=0, N2=6, N3=0, N4=3, N6=2} may be used for a resource allocation of {2x, 2x+1} with x=0, 1, ..., 5, {4x, 4x+1, 4x+2, 4x+3} with x=0, 1, 2, and {6x, 6x+1, ..., 6x+5} with x=0, 1. Similarly, the set of potential resource allocations can be limited for CE mode B to have 3 bits for resource allocation indication. In another example, with a 3.75 kHz subcarrier spacing and single-tone allocation, 4 bits in CE mode A can indicate subcarrier index from {0, 1, ..., 15}, while 3 bits in CE mode B can indicate subcarrier index from {0, 1, ..., 7}.

Alternatively, additional bits may be added in a third embodiment, where the resource allocation methods discussed above may be used. In a fourth embodiment, the number of bits for a resource allocation method in the MPDCCH for support of sub-PRB allocation may be denoted by M. In this case, a predefined value, e.g. 0, may be assumed for M-4 MSB bits for a resource allocation of Msg 3 in CE mode A. and for M-3 MSB bits for a resource allocation of Msg 3 in CE mode B.

Y bits can be used in the RAR grant for an indication of the number of resource units, e.g. Y=3 for CE mode A and Y=1 for CE mode B. The RAR may also contain a MCS/TBS indication for Msg 3 with sub-PRB allocation. In one embodiment, the same number of bits in the MCS/TBS field in Rel-13 eMTC can be reused for a RAR grant supporting sub-PRB allocation of Msg 3. For CE mode A, the TBS can be determined from MCS indices from 0 to 7 by looking up the TBS table used for sub-PRB allocation of Rel-15 efeMTC UEs. For CE mode B, the TBS can be indicated directly from TBS indices from 0 to 3 by looking up the TBS table used for sub-PRB allocation of Rel-15 efeMTC UEs. Alternatively, a greater number of bits can be used for MCS/TBS indication.

Turning to the Uplink Control Information (UCI), in some embodiments, sub-PRB allocation may not be supported for a PUSCH transmission with the UCI. For example, if a sub-PRB allocation is indicated for a PUSCH transmission, when a PUCCH transmission overlaps with the PUSCH transmission, the PUSCH transmission may always be dropped regardless of the number of repetitions used for the PUCCH transmission.

In another embodiment, whether to piggyback the UCI in the PUSCH transmission or drop the PUSCH transmission for the PUCCH transmission can follow the Rel-13 eMTC rules, when a sub-PRB allocation is used for the PUSCH transmission. For example, the UCI can be piggybacked in the PUSCH transmission when a multi-tone PUSCH transmission is scheduled, while piggybacked may be avoided for a single-tone PUSCH transmission. Alternatively, both multi-tone and single-tone PUSCH transmissions may support a piggybacked UCI. When the UCI is allowed to be piggybacked in the PUSCH transmission, the UCI RE mapping may be designed for sub-PRB allocation.

For a multi-tone PUSCH transmission, the UCI mapping can be extended from LTE. In a time first mapping, the mapping can be extended from 1 subframe to 1 RU. For example, the CQI/PMI resources may be placed at the beginning of UL-SCH data resources and mapped sequentially to all symbols within RU on one subcarrier before continuing on the next subcarrier. The UL-SCH data may be rate-matched around CQI/PMI. A/N resources may be mapped to symbols next to RSs within the RU. The UL-SCH data can be punctured on these REs, or alternatively rate-matched around these REs. RI symbols may be placed next to A/N symbol positions, irrespective of whether A/N is actually present or not. The UL-SCH data may again be rate-matched around RI.

For a single-tone PUSCH transmission, if UCI piggybacked in a single-tone PUSCH transmission is supported, the UCI mapping can be one of various embodiments. In one embodiment, the CQI/PMI may be mapped first. In another embodiment, the A/N may be mapped to symbols next to RSs. The UL-SCH data/CQI/PMI may be punctured on the REs for the A/N, or rate matched around REs for the A/N. Alternatively, the A/N may be mapped to the subframe carrying the UL-SCH data without CQI/PMI. In another embodiment, the RI may be placed next to the A/N. RI may exist in every subframe, or only in the subframes without CQI/PMI. The UL-SCH data/CQI/PMI may be punctured on the REs for the RI, or be rate-matched around the REs for the RI.

The impact of sub-PRB allocations on TDD systems may be varied. In one embodiment, sub-PRB allocation may be supported only for FDD. In another embodiment, the support of sub-PRB allocation may depend on the number of subcarriers for the sub-PRB allocations and/or the TDD configurations. For example, in one embodiment, only a multi-tone sub-PRB allocation may be supported for TDD. In another embodiment, only certain TDD configurations, e.g. TDD configurations 0, 1, 3, 4, and/or 6 may support sub-PRB allocation. In another embodiment, different TDD configurations may support different sub-PRB allocations. For example, TDD configurations 0, 1 and/or 6 may support 3-tone and 6-tone allocations, TDD configurations 3 and/or 4 may support 6-tone allocation, and TDD configuration 2 may support 6-tone allocation.

Regarding collision handling and frequency retuning, the same rules for collision handling for a PUSCH transmission with no less than 1 PRB allocation can be applied to a sub-PRB PUSCH transmission. This is to say that for a collision with the Sounding Reference Signal (SRS), if a sub-PRB PUSCH transmission is supported in CE mode A, the last symbol of the PUSCH transmission with sub-PRB allocation can be rate-matched around if the PUSCH transmission collides with the cell-specific SRS BW. Alternatively, the last symbol of sub-PRB PUSCH transmission can be punctured. The SRS may always be dropped if retuning is used for a sub-PRB PUSCH transmission due to the SRS transmission.

In CE mode B, the last symbol of a sub-PRB PUSCH transmission can be punctured if the PUSCH transmission collides with the cell-specific SRS. This may allow symbol level combining. Alternatively, the last symbol of a sub-PRB PUSCH transmission can be rate matched around if the PUSCH transmission collides with the cell-specific SRS.

Following the (f) eMTC design, the UE can postpone transmitting a sub-PRB PUSCH transmission to the next available UL subframe if in an invalid UL subframe. The UE can drop a sub-PRB PUSCH transmission in subframes that are unavailable due to a UE-specific configuration or behavior such as measurement gap. Alternatively, the UE can drop the sub-PRB PUSCH transmission in invalid UL subframes. The UE can postpone the sub-PRB PUSCH transmission in subframes that are unavailable due to a UE-specific configuration or measurement gap. When the sub-PRB PUSCH transmission collides with PRACH resources or a PUCCH transmission, the sub-PRB PUSCH transmission in the colliding subframes may be dropped. Alternatively, the sub-PRB PUSCH transmission in colliding subframes can be postponed.

For frequency retuning, the same retuning rules for a PUSCH transmission with no less than 1 PRB allocation in (f) eMTC can be applied to a sub-PRB PUSCH transmission. Specifically, for UEs that use 2 symbols for retuning when the UE retunes from a PUSCH transmission to a PUSCH NB/WB transmission, the last symbol of an earlier subframe and a first symbol of the latter subframe may be punctured. When the UE retunes from a PUCCH transmission to a PUSCH NB/WB transmission, if the PUCCH transmission uses a shortened PUCCH format, the last symbol in the earlier subframe and the first symbol in the latter subframe may be used as the guard period. Otherwise, the first two symbols of the latter subframe may be used as the guard period. When the UE retunes from a PUSCH transmission to a PUCCH NB/WB transmission, the last two symbols of the earlier subframe may be punctured.

For UEs that use only 1 symbol for retuning, when the UE retunes from a PUSCH transmission to a PUSCH NB/WB transmission, the last symbol of the earlier subframe may be punctured. For a UE that retunes from a PUCCH transmission to a PUSCH NB/WB transmission, if the PUCCH transmission uses a shortened PUCCH format, the last symbol in the earlier subframe can be used as the guard period. Otherwise, the first symbol of the latter subframe may be used as the guard period. For a UE that retunes from a PUSCH transmission to a PUCCH NB/WB transmission, the last symbol of the earlier subframe may be punctured.

Various frequency hopping designs for a PUSCH transmission with a sub-PRB allocation may be contemplated. In one option, frequency hopping may not be supported for sub-PRB allocation.

In a second option frequency hopping may follow the Rel-13 eMTC frequency hopping mechanism. For example, the enabling/disabling of frequency hopping may be configured via a UE-specific higher layer (e.g., dedicated RRC) signaling. Further, an indication may be provided to UEs in CE mode A whether or not to use frequency hopping (once enabled by the higher layer configuration). The indication may be provided in a dynamic manner via the DCI indicating the DL assignment or UL grant. A cell that is specifically configured offset for frequency hopping may be indicated in terms of NBs and wrap around applied at the end of the LTE band edges. For instance, if the initial NB is NB0, then the frequency hopped NB may be given by NB1=(NB0+frequency hopping_offset) modulo N_NB, where the frequency hopping_offset may be a cell-specific frequency hopping offset and N_NB may be the number of 6-PRB NBs in the LTE system BW. When frequency hopping may be applied, the same frequency domain resources may be maintained for a certain (configured) number of subframes, referred to as "FH interval".

The frequency hopping interval above can be determined based on the various methods. The frequency hopping interval can be any value configured by higher layer signaling. Alternatively, the frequency hopping interval may be the max{configured frequency hopping interval by higher layer signaling, SFs per RU}. In other words, the frequency hopping interval may be at least the number of SFs per RU. With this option, the frequency domain resources can be maintained across one RU. Alternatively, it may be up to the eNB scheduling to ensure that the frequency hopping interval is no less than SFs per RU. If the UE happens to have configured frequency hopping interval less than SFs per RU, the UE may either consider this as an error case and drop the PUSCH transmission, or not apply frequency hopping for the PUSCH transmission.

In a third option for frequency hopping, the frequency hopping may be based on the Rel-13 eMTC frequency hopping mechanism. On top of this mechanism, a different frequency hopping granularity may be used—in units of PRB/subcarrier. Other configurations, e.g. a frequency hopping interval configuration, may follow option 2.

The frequency hopping granularity in the third option can be in units of a subcarrier. For example, the reference subcarrier (denoted by SC0) can be predefined/configured (e.g. the starting subcarrier allocated for the PUSCH transmission), and the subcarrier where the reference subcarrier SC0 frequency hopped to can be determined by SC1=(SC0+FH_offset) modulo N_SC, where N_SC is the number of subcarriers in the system. The other allocated subcarriers may keep the same locations with respect to the reference subcarrier before and after frequency hopping. If the allocated resources are fragmented across the two edges of the system BW, the PUSCH transmission can be dropped or no frequency hopping may be applied.

Alternatively, the frequency hopping_offset in the third option may remain in units of NB, and the frequency-hopped NB still be given by NB1=(NB0+frequency hopping_offset) modulo N_NB. Within the hopped NB, i.e. NB1, the hopped subcarrier(s) may be (N_SC_NB−SC_index(es)), where N_SC_NB is the number of subcarriers in the NB, and SC_index(es) is the subcarrier index(es) within NB0 before frequency hopping.

The frequency hopping granularity may be in units of PRB instead of in units of subcarrier. The allocated subcarrier(s) within the PRB can be the same, or may be (N_SC_PRB-SC_index(es)), where N_SC_PRB is the number of subcarriers within the PRB, and the SC_index(es) is the subcarrier index(es) within the PRB before frequency hopping.

In this case, for the determination of the frequency hopped PRB, different methods can be considered. For example, the reference PRB (denoted by PRB0) can be predefined/configured, and the PRB where the reference PRB0 frequency hopped to can be determined by PRB1=(PRB0+FH_offset) modulo N_PRB, where N_PRB is the number of PRBs in the system. If the allocated resources are fragmented across the two edges of the system BW, the PUSCH transmission can be dropped or no frequency hopping may be applied. Alternatively, the frequency hopping_offset may remain in units of NB, and the hopped NB still be given by NB1= (NB0+frequency hopping_offset) modulo N_NB. In this case, within the frequency hopped NB, NB1, the frequency hopped subcarrier may be (N_PRB_NB−PRB_index), where N_PRB_NB is the number of PRBs in the NB, and PRB_index is the PRB index within NB0 before frequency hopping.

EXAMPLES

Example 1 is an apparatus of an even further enhanced machine-type communications user equipment (efeMTC UE), the apparatus comprising: processing circuitry arranged to: encode, for transmission to one of an evolved NodeB (eNB) or a next generation NodeB (gNB), support for a sub-physical resource block (PRB) physical uplink shared channel (PUSCH) transmission in a capability information element of a radio resource control (RRC) message; decode, from the one of the eNB or the gNB, dedicated RRC signaling that contains a sub-PRB configuration; decode, from the one of the eNB or the gNB, an allocation for a PUSCH transmission: determine that the allocation is a sub-PRB allocation; and encode, for transmission to the one of the eNB or the gNB, the PUSCH transmission on the sub-PRB allocation: and a memory configured to store the sub-PRB configuration.

In Example 2, the subject matter of Example 1 includes, wherein: the processing circuitry is further arranged to decode semi-statistical RRC signaling that comprises the sub-PRB configuration, and the sub-PRB configuration is dependent on at least one of a maximum PUSCH channel bandwidth, a coverage enhancement (CE) mode, a minimum repetition level (RL) configured for the PUSCH or a time division duplexing (TDD) configuration.

In Example 3, the subject matter of Example 2 includes, wherein the processing circuitry is further arranged to: determine from the dedicated RRC signaling that the sub-PRB allocation is unavailable when the maximum PUSCH channel bandwidth is larger than a predetermined bandwidth.

In Example 4, the subject matter of Examples 2-3 includes, wherein the processing circuitry is further arranged to: determine from the dedicated RRC signaling that the sub-PRB allocation is unavailable when the efeMTC UE is in coverage enhancement (CE) mode A.

In Example 5, the subject matter of Examples 2-4 includes, wherein the processing circuitry is further arranged to: determine from the dedicated RRC signaling that the sub-PRB allocation is unavailable when the minimum RL is smaller than a predetermined value.

In Example 6, the subject matter of Examples 1-5 includes, wherein the processing circuitry is further arranged to: limit support sub-PRB allocation to a PUSCH other than a PUSCH used for carrying message 3 of a Random Access Channel (RACH) process.

In Example 7, the subject matter of Examples 1-6 includes, wherein the processing circuitry is further arranged to: determine that the allocation is the sub-PRB allocation from a 1-bit flag in the allocation in downlink control information (DCI).

In Example 8, the subject matter of Examples 1-7 includes, wherein the processing circuitry is further arranged to: determine, from the allocation, a narrowband (NB) resource allocation from a NB index, a PRB in a NB indicated by the NB index, and a subcarrier indication.

In Example 9, the subject matter of Example 8 includes, wherein the processing circuitry is further arranged to: determine the PRB from one of: 3 bits in the allocation, the 3 bits configured to provide an explicit indication of the PRB in the NB, a predefined or RRC configured PRB of the NB, a single bit to indicate whether the PRB is a starting or ending PRB of the NB, or multiple bits to indicate which of N candidate PRBs of the NB is the PRB.

In Example 10, the subject matter of Examples 8-9 includes, wherein the processing circuitry is further arranged to: determine the subcarrier indication from: when subcarrier spacings other than a 15 kHz subcarrier spacing are unsupported: 5 bits to indicate a first set of allocated subcarriers, 3 bits to indicate a second set of allocated subcarriers when 3, 6 and 12-tone allocations are supported, a reserved Isc entry to indicate 2 or 4 tones, or 2 bits to indicate a third set of allocated subcarriers when 3 or 6-tone allocations are supported and 12-tone allocations are unsupported, 6 bits when a 3.75 kHz and 15 kHz subcarrier spacing are supported, and a number of bits that is dependent on a coverage enhancement (CE) mode of the efeMTC UE.

In Example 11, the subject matter of Examples 1-10 includes, wherein the processing circuitry is further arranged to: limit modulation to quadrature phase shift keying (QPSK) for a multi-tone PUSCH and π/2 binary phase shift keying (BPSK) and π/4 QPSK for a single-tone PUSCH.

In Example 12, the subject matter of Examples 1-11 includes, wherein the processing circuitry is further arranged to: support a different number of redundancy versions (RVs) for sub-PRB allocation than for a non-sub-PRB allocation, and change the RV supported for sub-PRB allocation per subframe, resource unit (RU) or set of RUs.

In Example 13, the subject matter of Examples 1-12 includes, wherein the processing circuitry is further arranged to: support 4 redundancy versions (RVs) for sub-PRB allocation and for a non-sub-PRB allocation.

In Example 14, the subject matter of Examples 1-13 includes, wherein the processing circuitry is further arranged to: support a transport block size (TBS) for the PUSCH that is equal or larger than a TBS supported for a narrowband internet-of-things (NB-IoT) PUSCH.

In Example 15, the subject matter of Examples 1-14 includes, wherein: the sub-PRB allocation is provided in a MTC physical downlink control channel (MPDCCH) formed in accordance with downlink control information (DCI) format 6-0A for Coverage Enhancement (CE) mode A and 6-0B for CE mode B.

In Example 16, the subject matter of Examples 1-15 includes, wherein the processing circuitry is further arranged to: determine, from one of higher layer signaling or a downlink control information (DCI) format, whether to use a denser Demodulation Reference Signal (DMRS) for sub-PRB allocation than for PRB allocation.

In Example 17, the subject matter of Example 16 includes, wherein the processing circuitry is further arranged to: use the denser DMRS when a total scheduled duration of the PUSCH is no less than a predetermined time period that is configured by higher layer signaling, use a 3-tone and 6-tone narrowband Internet-of-Things (NB-IoT) DMRS sequence respectively for a 3-tone and 6-tone PUSCH, use a Gold sequence for a single-tone PUSCH, use a length 2 and 4 DMRS sequence respectively for a 2-tone and 4-tone PUSCH, wherein the length 2 and 4 DMRS sequence is punctured from a 3-tone, 6-tone or 12-tone DMRS sequence or a new sequence is defined.

In Example 18, the subject matter of Examples 1-17 includes, wherein the processing circuitry is further arranged to: decode a Random Access Response (RAR) that comprises at most a single bit that indicates a subcarrier spacing, a single bit that indicates whether the resource allocation is the sub-PRB allocation, a reinterpretation of a resource allocation field for a sub-PRB allocation, a coverage enhancement (CE) mode-dependent number of bits that indicate a number of resource units and a modulation and coding scheme (MCS) and transport block size (TBS) indication for random access channel message 3.

In Example 19, the subject matter of Examples 1-18 includes, wherein the processing circuitry is further arranged to: determine that sub-PRB allocation is unsupported for a PUSCH transmission that includes uplink control information (UCI); and drop a PUSCH that overlaps with a physical uplink control channel (PUCCH) regardless of a number of repetitions used for the PUCCH.

In Example 20, the subject matter of Examples 1-19 includes, wherein the processing circuitry is further arranged to: determine whether sub-PRB allocation is supported for a PUSCH transmission that includes uplink control information (UCI); and piggyback the UCI in the PUSCH when the PUSCH is a multi-tone PUSCH and drop the PUSCH when the PUSCH is a single-tone PUSCH.

In Example 21, the subject matter of Examples 1-20 includes, wherein the processing circuitry is further arranged to: determine a coverage enhancement (CE) mode of the UE; determine whether the PUSCH collides with a cell-specific Sounding Reference Signal (SRS); and when the UE is in CE mode A or B and is determined to collide with the cell-specific SRS, rate match around or puncture a last symbol of the PUSCH that collides with the cell-specific SRS.

In Example 22, the subject matter of Examples 1-21 includes, wherein the processing circuitry is further arranged to: limit support to a 15 kHz subcarrier spacing for a multi-tone PUSCH, support to a 3.75 kHz or 15 kHz subcarrier spacing for a single-tone PUSCH.

In Example 23, the subject matter of Examples 1-22 includes, wherein the processing circuitry is further arranged to: configure frequency hopping for the PUSCH transmission on the sub-PRB allocation to follow enhanced Machine-Type Communications (MTC) frequency hopping.

In Example 24, the subject matter of Example 23 includes, wherein the processing circuitry is further arranged to: determine, when the UE is in coverage enhancement (CE) mode A, whether to use frequency hopping to based on an uplink grant or downlink control information (DCI).

In Example 25, the subject matter of Examples 1-24 includes, wherein the processing circuitry is further arranged to: configure frequency hopping for the PUSCH transmission on the sub-PRB allocation to follow enhanced Machine-Type Communications (MTC) frequency hopping with enhanced granularity in units of subcarriers.

In Example 26, the subject matter of Examples 1-25 includes, wherein: the processing circuitry comprises a baseband processor configured to encode transmissions to, and decode transmissions from, the one of the eNB or the gNB.

Example 27 is an apparatus of an evolved NodeB (eNB), the apparatus comprising: a memory; processing circuitry arranged to: determine whether an indication whether an even further enhanced machine-type communications user equipment (efeMTC UE) supports a sub-physical resource block (PRB) physical uplink shared channel (PUSCH) transmission is stored in the memory; decode, from the efeMTC UE, a random access channel (RACH) message 3 on a PRB allocation in response to a determination that the indication is not stored in the memory, determine that the efeMTC UE supports the sub-PRB PUSCH transmission from a capability information element of a radio resource control (RRC) message received from the efeMTC UE after transmission of the RACH message 3, the capability information element stored in the memory as the indication; encode, for transmission to the efeMTC UE after reception of the capability information element, a sub-PRB allocation for a PUSCH transmission; and decode, from the efeMTC UE, the PUSCH transmission on the sub-PRB allocation.

In Example 28, the subject matter of Example 27 includes, wherein: the processing circuitry is further arranged to encode semi-statistical RRC signaling that comprises a sub-PRB configuration prior to reception of the PUSCH transmission, and the sub-PRB configuration is dependent on at least one of a maximum PUSCH channel bandwidth, a coverage enhancement (CE) mode, a minimum repetition level (RL) configured for the PUSCH or a time division duplexing (TDD) configuration.

In Example 29, the subject matter of Example 28 includes, wherein: the sub-PRB allocation is unavailable when at least one of the maximum PUSCH channel bandwidth is larger than a predetermined bandwidth, the efeMTC UE is in coverage enhancement (CE) mode A, or the minimum RL is smaller than a predetermined value.

In Example 30, the subject matter of Examples 27-29 includes, wherein at least one of: the processing circuitry is configured to indicate a narrowband (NB) resource allocation from a NB index, a PRB in a NB indicated by the NB index, and a subcarrier indication, or the sub-PRB allocation is indicated by a 1-bit flag.

Example 31 is a computer-readable storage medium that stores instructions for execution by one or more processors of an even further enhanced machine-type communications user equipment (efeMTC UE), the one or more processors to configure the efeMTC UE to, when the instructions are executed: transmit to a next generation NodeB (gNB) support for a sub-physical resource block (PRB) physical uplink shared channel (PUSCH) transmission in a capability information element of a radio resource control (RRC) message; receive, from the one of the eNB or the gNB, semi-statistical dedicated RRC signaling that contains a sub-PRB configuration that is dependent on a sub-a maximum PUSCH channel bandwidth, a coverage enhancement (CE) mode, a minimum repetition level (RL) configured for the PUSCH or a time division duplexing (TDD) configuration; receive a sub-PRB PUSCH transmission allocation; and transmit a sub-PRB PUSCH transmission on the sub-PRB PUSCH transmission allocation.

In Example 32, the subject matter of Example 31 includes, wherein the instructions, when executed, further configure the efeMTC UE to at least one of: determine that the sub-PRB allocation is unavailable when the maximum PUSCH channel bandwidth is larger than a predetermined bandwidth, the efeMTC UE is in coverage enhancement (CE) mode A, or the minimum RL is smaller than a predetermined value, or limit modulation to quadrature phase shift keying (QPSK) for a multi-tone PUSCH and π/2 binary phase shift keying (BPSK) and π/4 QPSK for a single-tone PUSCH.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of an even further enhanced machine-type communications user equipment (efeMTC UE), the apparatus comprising:
   processing circuitry arranged to:
      encode, for transmission to one of an evolved NodeB (eNB) or a next generation NodeB (gNB), support for a sub-physical resource block (PRB) physical uplink shared channel (PUSCH) transmission in a capability information element of a radio resource control (RRC) message;
      decode, from the one of the eNB or the gNB, dedicated RRC signaling that contains a sub-PRB configuration;
      decode, from the one of the eNB or the gNB, an allocation for a PUSCH transmission;
      determine that the allocation is a sub-PRB allocation; and
      encode, for transmission to the one of the eNB or the gNB, the PUSCH transmission on the sub-PRB allocation; and
   a memory configured to store the sub-PRB configuration.

2. The apparatus of claim 1, wherein:
   the processing circuitry is further arranged to decode semi-statistical RRC signaling that comprises the sub-PRB configuration, and
   the sub-PRB configuration is dependent on at least one of a maximum PUSCH channel bandwidth, a coverage enhancement (CE) mode, a minimum repetition level (RL) configured for the PUSCH or a time division duplexing (TDD) configuration.

3. The apparatus of claim 2, wherein the processing circuitry is further arranged to at least one of:
   determine from the dedicated RRC signaling that the sub-PRB allocation is unavailable when the maximum PUSCH channel bandwidth is larger than a predetermined bandwidth, determine from the dedicated RRC signaling that the sub-PRB allocation is unavailable when the efeMTC UE is in coverage enhancement (CE) mode A, or determine from the dedicated RRC signaling that the sub-PRB allocation is unavailable when the minimum RL is smaller than a predetermined value.

4. The apparatus of claim 1, wherein the processing circuitry is further arranged to:

limit support sub-PRB allocation to a PUSCH other than a PUSCH used for carrying message 3 of a Random Access Channel (RACH) process.

5. The apparatus of claim 1, wherein the processing circuitry is further arranged to:

determine that the allocation is the sub-PRB allocation from a 1-bit flag in the allocation in downlink control information (DCI).

6. The apparatus of claim 1, wherein the processing circuitry is further arranged to:

determine, from the allocation, a narrowband (NB) resource allocation from a NB index, a PRB in a NB indicated by the NB index, and a subcarrier indication, and determine the PRB from one of:
3 bits in the allocation, the 3 bits configured to provide an explicit indication of the PRB in the NB,
a predefined or RRC configured PRB of the NB,
a single bit to indicate whether the PRB is a starting or ending PRB of the NB, or
multiple bits to indicate which of N candidate PRBs of the NB is the PRB.

7. The apparatus of claim 1, wherein the processing circuitry is further arranged to:

determine, from the allocation, a narrowband (NB) resource allocation from a NB index, a PRB in a NB indicated by the NB index, and a subcarrier indication, and determine the subcarrier indication from:
when subcarrier spacings other than a 15 kHz subcarrier spacing are unsupported:
5 bits to indicate a first set of allocated subcarriers,
3 bits to indicate a second set of allocated subcarriers when 3, 6 and 12-tone allocations are supported,
a reserved Isc entry to indicate 2 or 4 tones, or
2 bits to indicate a third set of allocated subcarriers when 3 or 6-tone allocations are supported and 12-tone allocations are unsupported,
6 bits when a 3.75 kHz and 15 kHz subcarrier spacing are supported, and
a number of bits that is dependent on a coverage enhancement (CE) mode of the efeMTC UE.

8. The apparatus of claim 1, wherein the processing circuitry is further arranged to:

support a different number of redundancy versions (RVs) for sub-PRB allocation than for a non-sub-PRB allocation, and change the RV supported for sub-PRB allocation per subframe, resource unit (RU) or set of RUs.

9. The apparatus of claim 1, wherein the processing circuitry is further arranged to:

support 4 redundancy versions (RVs) for sub-PRB allocation and for a non-sub-PRB allocation.

10. The apparatus of claim 1, wherein:

the sub-PRB allocation is provided in an MTC physical downlink control channel (MPDCCH) formed in accordance with downlink control information (DCI) format 6-0A for Coverage Enhancement (CE) mode A and 6-0B for CE mode B.

11. The apparatus of claim 1, wherein the processing circuitry is further arranged to:

determine, from one of higher layer signaling or a downlink control information (DCI) format, whether to use a denser Demodulation Reference Signal (DMRS) for sub-PRB allocation than for PRB allocation.

12. The apparatus of claim 11, wherein the processing circuitry is further arranged to:

use the denser DMRS when a total scheduled duration of the PUSCH is no less than a predetermined time period that is configured by higher layer signaling, use a 3-tone and 6-tone narrowband Internet-of-Things (NB-IoT) DMRS sequence respectively for a 3-tone and 6-tone PUSCH, use a Gold sequence for a single-tone PUSCH, use a length 2 and 4 DMRS sequence respectively for a 2-tone and 4-tone PUSCH, wherein the length 2 and 4 DMRS sequence is punctured from a 3-tone, 6-tone or 12-tone DMRS sequence or a new sequence is defined.

13. The apparatus of claim 1, wherein the processing circuitry is further arranged to:

decode a Random Access Response (RAR) that comprises at most a single bit that indicates a subcarrier spacing, a single bit that indicates whether the resource allocation is the sub-PRB allocation, a reinterpretation of a resource allocation field for a sub-PRB allocation, a coverage enhancement (CE) mode-dependent number of bits that indicate a number of resource units and a modulation and coding scheme (MCS) and transport block size (TBS) indication for random access channel message 3.

14. The apparatus of claim 1, wherein the processing circuitry is further arranged to:

determine that sub-PRB allocation is unsupported for a PUSCH transmission that includes uplink control information (UCI); and at least one of: drop a PUSCH that overlaps with a physical uplink control channel (PUCCH) regardless of a number of repetitions used for the PUCCH or piggyback the UCI in the PUSCH when the PUSCH is a multi-tone PUSCH and drop the PUSCH when the PUSCH is a single-tone PUSCH.

15. The apparatus of claim 1, wherein the processing circuitry is further arranged to:

determine a coverage enhancement (CE) mode of the UE;

determine whether the PUSCH collides with a cell-specific Sounding Reference Signal (SRS); and when the UE is in CE mode A or B and is determined to collide with the cell-specific SRS, rate match around or puncture a last symbol of the PUSCH that collides with the cell-specific SRS.

16. The apparatus of claim 1, wherein the processing circuitry is further arranged to:

configure frequency hopping for the PUSCH transmission on the sub-PRB allocation to follow enhanced Machine-Type Communications (MTC) frequency hopping with enhanced granularity in units of subcarriers.

17. An apparatus of an evolved NodeB (eNB), the apparatus comprising:

a memory;

processing circuitry arranged to:
determine whether an indication whether an even further enhanced machine-type communications user equipment (efeMTC UE) supports a sub-physical resource block (PRB) physical uplink shared channel (PUSCH) transmission is stored in the memory;

decode, from the efeMTC UE, a random access channel (RACH) message 3 on a PRB allocation in response to a determination that the indication is not stored in the memory;

determine that the efeMTC UE supports the sub-PRB PUSCH transmission from a capability information element of a radio resource control (RRC) message received from the efeMTC UE after transmission of the RACH message 3, the capability information element stored in the memory as the indication;

encode, for transmission to the efeMTC UE after reception of the capability information element, a sub-PRB allocation for a PUSCH transmission; and decode, from the efeMTC UE, the PUSCH transmission on the sub-PRB allocation.

18. The apparatus of claim 17, wherein:

the processing circuitry is further arranged to encode semi-statistical RRC signaling that comprises a sub-PRB configuration prior to reception of the PUSCH transmission, and the sub-PRB configuration is dependent on at least one of a maximum PUSCH channel bandwidth, a coverage enhancement (CE) mode, a minimum repetition level (RL) configured for the PUSCH or a time division duplexing (TDD) configuration.

19. A non-transitory computer-readable storage medium that stores instructions for execution by one or more processors of an even further enhanced machine-type communications user equipment (efeMTC UE), the one or more processors to configure the efeMTC UE to, when the instructions are executed:

transmit to a next generation NodeB (gNB) support for a sub-physical resource block (PRB) physical uplink shared channel (PUSCH) transmission in a capability information element of a radio resource control (RRC) message;

receive, from the one of an evolved NodeB 'eNB' or the gNB, semi-statistical dedicated RRC signaling that contains a sub-PRB configuration that is dependent on a sub-a maximum PUSCH channel bandwidth, a coverage enhancement (CE) mode, a minimum repetition level (RL) configured for the PUSCH or a time division duplexing (TDD) configuration;

receive a sub-PRB PUSCH transmission allocation; and transmit a sub-PRB PUSCH transmission on the sub-PRB PUSCH transmission allocation.

20. The medium of claim 19, wherein the instructions, when executed, further configure the efeMTC UE to at least one of:

determine that the sub-PRB allocation is unavailable when the maximum PUSCH channel bandwidth is larger than a predetermined bandwidth, the efeMTC UE is in coverage enhancement (CE) mode A, or the minimum RL is smaller than a predetermined value, or limit modulation to quadrature phase shift keying (QPSK) for a multi-tone PUSCH and π/2 binary phase shift keying (BPSK) and π/4 QPSK for a single-tone PUSCH.

* * * * *